US012231646B2

United States Patent
Piao et al.

(10) Patent No.: US 12,231,646 B2
(45) Date of Patent: Feb. 18, 2025

(54) APPARATUS AND METHOD FOR APPLYING ARTIFICIAL INTELLIGENCE-BASED FILTERING TO IMAGE

(71) Applicant: SAMSUNG ELECTRONICS CO., LTD., Suwon-si (KR)

(72) Inventors: Yinji Piao, Suwon-si (KR); Kyungah Kim, Suwon-si (KR); Quockhanh Dinh, Suwon-si (KR); Minsoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 253 days.

(21) Appl. No.: 17/880,840

(22) Filed: Aug. 4, 2022

(65) Prior Publication Data

US 2023/0044603 A1 Feb. 9, 2023

Related U.S. Application Data

(63) Continuation of application No. PCT/KR2022/011429, filed on Aug. 2, 2022.

(30) Foreign Application Priority Data

Aug. 6, 2021 (KR) .................. 10-2021-0104202
Mar. 4, 2022 (KR) .................. 10-2022-0028221

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/30* (2014.11)

(58) Field of Classification Search
CPC .... H04N 19/117; H04N 19/82; H04N 19/124; H04N 19/132; H04N 19/80; G06N 3/045; G06N 3/0464; G06F 2207/4824
See application file for complete search history.

(56) References Cited

U.S. PATENT DOCUMENTS 10,999,606 B2    5/2021   Mn et al.
2019/0258932 A1*  8/2019   Kang .................. G06N 3/04
                                       (Continued)

FOREIGN PATENT DOCUMENTS

JP      2020-28067 A      2/2020
KR   1020200016885 A      2/2020
                (Continued)

OTHER PUBLICATIONS

H. Wang et al., "JVET-V0114 EE1-1.3: Test on Neural Network-based In-Loop Filter with No Deblocking Filtering Stage", Qualcomm, 2021, 7 pages total.
(Continued)

*Primary Examiner* — Daniel Chang
(74) *Attorney, Agent, or Firm* — Sughrue Mion, PLLC

(57) ABSTRACT

An image processing apparatus including a memory storing instructions, and a processor configured to operate based on the instructions to reconstruct a current block from encoded data of the current block, obtain a quantization error map including sample values calculated based on a quantization parameter included in the encoded data, obtain a first modified block by applying the current block and the quantization error map to a neural network, obtain a first differential block between the current block and the first modified block, obtain a second differential block by changing sample values of the first differential block based on a parameter dependent (Continued)

on a feature of the current block, and obtain a second modified block by combining the current block and the second differential block.

19 Claims, 18 Drawing Sheets

(51) Int. Cl.
*H04N 19/176* (2014.01)
*H04N 19/30* (2014.01)

(56) References Cited

U.S. PATENT DOCUMENTS

| | | | |
|---|---|---|---|
| 2019/0273948 A1* | 9/2019 | Yin | G06N 3/045 |
| 2019/0394460 A1* | 12/2019 | Lee | H04N 19/96 |
| 2020/0120340 A1* | 4/2020 | Park | H04N 19/105 |
| 2020/0134833 A1* | 4/2020 | Biswas | G06N 5/046 |
| 2020/0145662 A1 | 5/2020 | Park et al. | |
| 2020/0213587 A1 | 7/2020 | Galpin et al. | |
| 2020/0218543 A1* | 7/2020 | Jung | G06N 20/10 |
| 2020/0311870 A1 | 10/2020 | Jung et al. | |
| 2020/0382794 A1* | 12/2020 | Katayama | H04N 19/172 |
| 2021/0012537 A1 | 1/2021 | Xu et al. | |
| 2021/0149383 A1* | 5/2021 | Yilmaz | G06N 3/045 |
| 2021/0158511 A1* | 5/2021 | Guo | G06T 3/18 |
| 2021/0158512 A1* | 5/2021 | Sun | G06T 13/80 |
| 2021/0159912 A1 | 5/2021 | Wang et al. | |
| 2021/0241421 A1* | 8/2021 | Pan | G06T 3/4046 |
| 2021/0295589 A1* | 9/2021 | Zhdan | G06N 20/00 |
| 2021/0334626 A1* | 10/2021 | Hang | G01S 5/011 |
| 2022/0026920 A1* | 1/2022 | Ebrahimi Afrouzi | G06N 7/01 |
| 2022/0030231 A1* | 1/2022 | Hu | H04N 19/159 |
| 2022/0078418 A1 | 3/2022 | Huang et al. | |
| 2022/0109890 A1* | 4/2022 | Li | H04N 19/85 |
| 2022/0224931 A1 | 7/2022 | Yang et al. | |

FOREIGN PATENT DOCUMENTS

| | | | |
|---|---|---|---|
| KR | 1020200114436 A | 10/2020 | |
| KR | 102272660 B1 | 7/2021 | |
| WO | 2017/036370 A1 | 3/2017 | |
| WO | 2019/135601 A1 | 7/2019 | |
| WO | WO-2020151714 A1 * | 7/2020 | H04N 19/107 |

OTHER PUBLICATIONS

H. Wang et al., "JVET-V0115 EE1-1.4: Test on Neural Network-based In-Loop Filter with Large Activation Layer", Qualcomm, 2021, 7 pages total.
Zhao Wang et al., "V0074: AHG11: Separate density attention network for loop filtering", 2021, 6 pages total.
Byeongdoo Choi et al., "JVET-V0090 AHG11: Neural network based temporal processing", Tencent Media Lab, 2021, 9 pages total.
Yue Li et al., "JVET-V0100 AHG11: Deep In-Loop Filter With Adaptive Model Selection", ByteDance, 2021, 9 pages total.
Yue Li et al., "JVET-V0101 AHG11: Conditional In-Loop Filter With Parameter Selection", ByteDance, 2021, 9 pages total.
Yat-Hong Lam et al., "AHG11: JVET-V0075 Content-adaptive neural network post-processing filter", Nokia, 2021, 12 pages total.
International Search Report (PCT/ISA/210) and Written Opinion (PCT/ISA/237) dated Oct. 28, 2022 issued by the International Searching Authority in International Application No. PCT/KR2022/011429.

* cited by examiner

FIG. 5

| CANDIDATE PARAMETER | FEATURE OF BLOCK |
|---|---|
| a | FEATURE VALUE < FIRST THRESHOLD VALUE |
| b | FIRST THRESHOLD VALUE ≤ FEATURE VALUE < SECOND THRESHOLD VALUE |
| c | SECOND THRESHOLD VALUE ≤ FEATURE VALUE |

FIG. 6

| PARAMETER SET | FEATURE OF BLOCK |
|---|---|
| P = {a, b, c} | FEATURE VALUE< THIRD THRESHOLD VALUE |
| Q = {d, e} | THIRD THRESHOLD VALUE ≤ FEATURE VALUE < FOURTH THRESHOLD VALUE |
| R = {a, g, h} | FOURTH THRESHOLD VALUE ≤ FEATURE VALUE |

FIG. 7

| SCALE FACTOR SET | |
|---|---|
| FIRST SET | {1, 0.75, 0.5, 0.25} |
| SECOND SET | {1, 0.75, 1.25, 0.5} |
| THIRD SET | {1, 1.25, 1.5, 1.75} |
| FOURTH SET | {4, 2} |
| FIFTH SET | {1, 7/8, 9/8, 3/4, 5/4, 5/8, 11/8, 1/2} |

FIG. 12

| WEIGHT SET | FEATURE OF BLOCK |
|---|---|
| WEIGHT SET A | FEATURE VALUE > FIRST THRESHOLD VALUE |
| WEIGHT SET B | FIRST THRESHOLD VALUE ≥ FEATURE VALUE > SECOND THRESHOLD VALUE |
| WEIGHT SET C | SECOND THRESHOLD VALUE ≥ FEATURE VALUE > THIRD THRESHOLD VALUE |
| none | THIRD THRESHOLD VALUE ≥ FEATURE VALUE |

FIG. 18
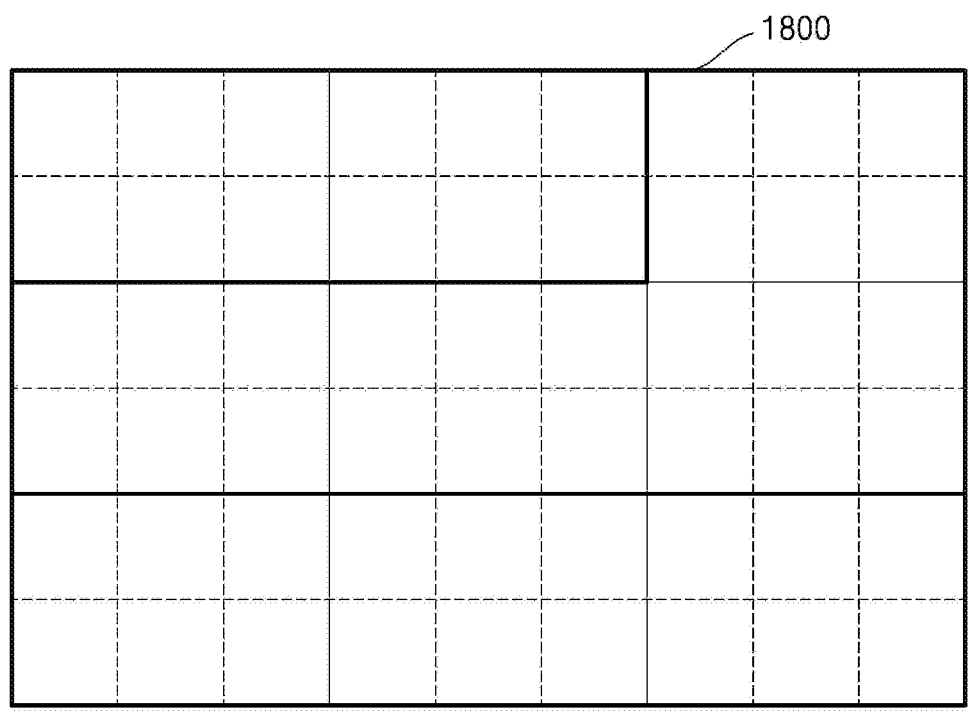
 Maximum CU     Tile     Slice

APPARATUS AND METHOD FOR APPLYING ARTIFICIAL INTELLIGENCE-BASED FILTERING TO IMAGE

CROSS-REFERENCE TO RELATED APPLICATIONS

This application is a Continuation application of International Application PCT/KR2022/011429 filed on Aug. 2, 2022, which claims benefit of Korean Patent Application No. 10-2021-0104202, filed on Aug. 6, 2021, and Korean Patent Application No. 10-2022-0028221, filed on Mar. 4, 2022, at the Korean Intellectual Property Office, the disclosures of which are incorporated herein in their entireties by reference.

FIELD

The disclosure relates to a method and apparatus for processing an image, and more particularly, to a method and apparatus for removing errors caused in a process of encoding and decoding an image, by applying an artificial intelligence (AI)-based filter to the image.

BACKGROUND

Codecs, such as H.264 Advanced Video Coding (AVC) and High Efficiency Video Coding (HEVC), divide an image into blocks and predictively encode and decode each block through inter prediction or intra prediction.

Intra prediction is a method of compressing an image by removing spatial redundancy in the image, and inter prediction is a method of compressing an image by removing temporal redundancy between images.

In an encoding process, a predicted block is generated through intra prediction or inter prediction, a residual block is generated by subtracting the predicted block from a current block, and residual samples of the residual block are transformed and quantized.

In a decoding process, residual samples of a residual block are generated by inverse-quantizing and inverse-transforming quantized transformation coefficients of the residual block, and a current block is reconstructed by adding the residual block to a predicted block generated through intra prediction or inter prediction. The reconstructed current block may be processed using one or more filtering algorithms and then output.

The codecs, such as H.264 AVC and HEVC, use a rule-based filtering algorithm to filter the reconstructed current block. The rule-based filtering algorithm may include, for example, a deblocking filter, a sample adaptive offset (SAO) filter, and an adaptive loop filter (ALF).

Although the rule-based filtering algorithm has traditionally shown good performance, because resolutions of images are increased and contents of images are diversified, an artificial intelligence (AI)-based filtering algorithm capable of flexibly considering features of images may be required.

SUMMARY

The disclosure provides an image processing apparatus and method for artificial intelligence (AI)-based filtering, the apparatus and method being capable of making a reconstructed block more similar to an original block by applying AI-based filtering to the reconstructed block.

The disclosure also provides an image processing apparatus and method for AI-based filtering, the apparatus and method being capable of more efficiently removing quantization errors in a reconstructed block.

The disclosure also provides an image processing apparatus and method for AI-based filtering, the apparatus and method being capable of improving the quality of a reconstructed block by applying AI-based filtering considering features of the reconstructed block.

According to an embodiment of the disclosure, an image processing apparatus for artificial intelligence (AI)-based filtering includes a memory storing one or more instructions, and a processor configured to operate based on the one or more instructions to reconstruct a current block from encoded data of the current block, obtain a quantization error map including sample values calculated based on a quantization parameter included in the encoded data, obtain a first modified block by applying the current block and the quantization error map to a neural network, obtain a first differential block between the current block and the first modified block, obtain a second differential block by changing sample values of the first differential block based on a parameter dependent on a feature of the current block, and obtain a second modified block by combining the current block and the second differential block.

An image processing apparatus and method for artificial intelligence (AI)-based filtering, according to an embodiment of the disclosure, may make a reconstructed block more similar to an original block by applying AI-based filtering to the reconstructed block.

Furthermore, an image processing apparatus and method for AI-based filtering, according to an embodiment of the disclosure, may more efficiently remove quantization errors in a reconstructed block.

In addition, an image processing apparatus and method for AI-based filtering, according to an embodiment of the disclosure, may improve the quality of a reconstructed block by applying AI-based filtering considering features of the reconstructed block.

BRIEF DESCRIPTION OF DRAWINGS

FIG. 5 is a table showing correspondences between candidate parameters and features of a block, according to an embodiment of the disclosure.

FIG. 6 is a table showing correspondences between parameter sets and features of a block, according to an embodiment of the disclosure.

FIG. 7 is a table showing a plurality of scale factor sets according to an embodiment of the disclosure.

FIG. 12 is a table showing correspondences between a plurality of weight sets and features of a block, according to an embodiment of the disclosure.

FIG. 18 is a diagram showing blocks divided from an image based on a tree structure.

DETAILED DESCRIPTION

Figure 1:
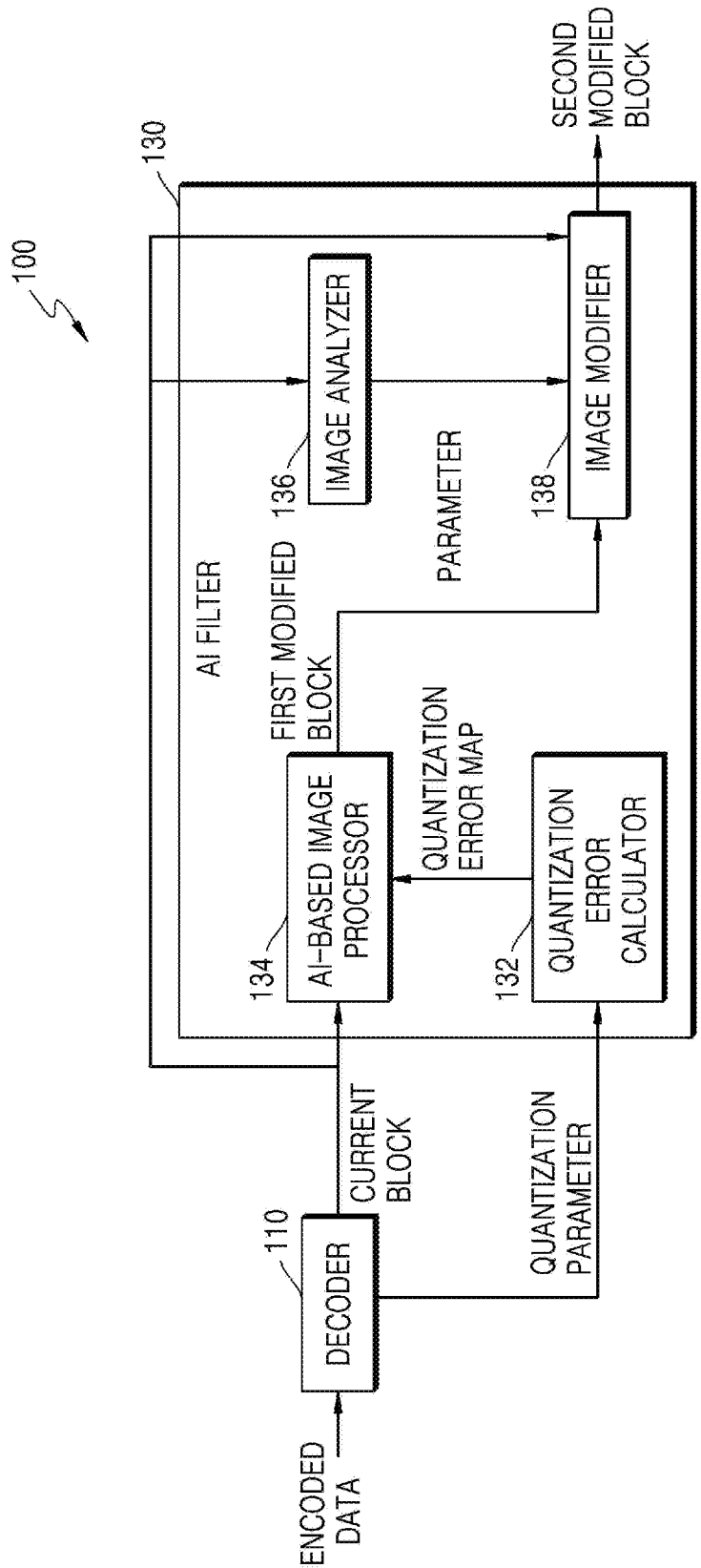
FIG. 1 is a block diagram of an image processing apparatus according to an embodiment of the disclosure.

According to an embodiment of the disclosure, an image processing apparatus for artificial intelligence (AI)-based filtering includes a memory storing one or more instructions, and a processor configured to operate based on the one or more instructions to reconstruct a current block from encoded data of the current block, obtain a quantization error map including sample values calculated based on a quantization parameter included in the encoded data, obtain a first modified block by applying the current block and the quantization error map to a neural network, obtain a first differential block between the current block and the first modified block, obtain a second differential block by changing sample values of the first differential block based on a parameter dependent on a feature of the current block, and obtain a second modified block by combining the current block and the second differential block.

The neural network may include at least one convolutional layer configured to output the first differential block by performing convolution on the current block and the quantization error map based on a preset weight, and a summation layer configured to output the first modified block by adding the first differential block and the current block.

The sample values of the quantization error map may correspond to a quantization step size or a quantization error value calculated based on the quantization parameter.

When quantization parameters for lower blocks of the current block are included in the encoded data, the sample values of the quantization error map may be calculated for each of the lower blocks.

The processor may be further configured to operate based on the one or more instructions to select a parameter indicated by first information obtained from the encoded data, from among a plurality of candidate parameters, and obtain the second differential block by changing the sample values of the first differential block based on the selected parameter.

The processor may be further configured to select a parameter set indicated by second information obtained from the encoded data, from among a plurality of parameter sets, and select the parameter indicated by the first information, from among the plurality of candidate parameters included in the selected parameter set.

The second information may be obtained for an upper block including the current block, and the first information may be obtained for the current block.

The processor may be further configured to obtain a feature value of the current block or an upper block of the current block to determine the parameter.

The feature value may be obtained based on at least one of i) a sum of squares of residual sample values obtained to reconstruct the current block or the upper block, ii) an average of the squares of the residual sample values, iii) a maximum value from among the residual sample values, iv) a maximum value from among absolute values of the residual sample values, v) a number of non-zero (0) transformation coefficients from among transformation coefficients corresponding to the residual samples, vi) a value indicating a type of a slice corresponding to the current block, vii) a ratio between an area of a block to which intra prediction is applied and an area of a block to which inter prediction is applied, in the current block or the upper block, viii) a sharpness of the current block or the upper block, ix) an average of one or more quantization step sizes calculated based on one or more quantization parameters set for the current block or the upper block, or x) an average of one or more quantization error values calculated from the one or more quantization parameters.

The parameter may include a scale factor, and the processor may be further configured to obtain the second differential block by scaling the sample values of the first differential block based on the scale factor.

The parameter may include a clipping factor, and the processor may be further configured to obtain the second differential block by clipping the sample values of the first differential block to be included between upper and lower limits corresponding to the clipping factor.

The processor may be further configured to obtain a feature value of the current block or an upper block of the current block, and select a weight set corresponding to the feature value from among a plurality of weight sets, and the current block and the quantization error map may be processed by a neural network operating based on the selected weight set.

The processor may be further configured to obtain a feature value of the current block or an upper block of the current block, and determine whether to apply the AI-based filtering to the current block, based on the obtained feature value.

The processor may be further configured to calculate an extension distance based on the number of convolutional layers included in the neural network, and a size of a filter kernel used by the convolutional layers, and apply, to the neural network, an extended block including samples of the current block, and neighboring samples corresponding to the extension distance from among neighboring samples outside a boundary of the current block in a current image.

When the boundary of the current block corresponds to a boundary of the current image, the neighboring samples corresponding to the extension distance may be determined from available closest samples.

The neural network may be trained based on loss information corresponding to a difference between an original block for training, and a first modified block for training, which is obtained through the neural network, and the first modified block for training may be obtained by applying, to the neural network, a current block for training, which is obtained by encoding and decoding the original block for training, and a quantization error map for training, which corresponds to the current block for training.

According to an embodiment of the disclosure, an image processing method includes reconstructing a current block from encoded data of the current block, obtaining a quantization error map including sample values calculated based on a quantization parameter included in the encoded data, obtaining a first modified block by applying the current block and the quantization error map to a neural network, obtaining a first differential block between the current block and the first modified block, obtaining a second differential block by changing sample values of the first differential block based on a parameter dependent on a feature of the current block, and obtaining a second modified block by combining the current block and the second differential block.

According to an embodiment of the disclosure, an image processing apparatus includes a memory storing one or more instructions, and a processor configured to operate based on the one or more instructions to reconstruct a current block from encoded data of the current block, obtain a quantization error map including sample values calculated based on a quantization parameter included in the encoded data, obtain a first differential block by applying the current block and the quantization error map to a neural network, obtain a second differential block by changing sample values of the first differential block based on a parameter dependent on a feature of the current block, and obtain a modified block by combining the current block and the second differential block.

While embodiments of the disclosure are susceptible to various modifications and alternative forms, specific embodiments thereof are shown by way of example in the drawings and will herein be described in detail. It should be understood, however, that there is no intent to limit embodiments of the disclosure to the particular forms disclosed, but conversely, embodiments of the disclosure are to cover all modifications, equivalents, and alternatives falling within the scope of the disclosure.

In the following description of the disclosure, a detailed description of known functions and configurations incorporated herein will be omitted when it may make the subject matter of the disclosure unclear. It will be understood that the terms "first", "second", etc. used herein are only to distinguish one element from another.

Throughout the disclosure, the expression "at least one of a, b or c" indicates only a, only b, only c, both a and b, both a and c, both b and c, all of a, b, and c, or variations thereof.

It will be also understood, in the disclosure, that when an element is referred to as being "connected" or "coupled" to another element, it may be directly connected or coupled to the other element or be connected or coupled to the other element through an intervening element, unless the context clearly indicates otherwise.

In the disclosure, two or more elements expressed as "units", "modules", or the like may be combined into one element, or one element may be divided into two or more elements for subdivided functions. Each element described herein may not only perform main functions thereof but also additionally perform some or all functions of other elements, and some main functions of each element may be exclusively performed by another element.

As used herein, the term "image" or "picture" may refer to a still image (or frame), a moving image including a plurality of consecutive still images, or a video.

A "neural network" is a representative example of an artificial neural network model that mimics brain nerves, and is not limited to an artificial neural network model using a specific algorithm. The neural network may also be referred to as a deep neural network.

A "weight" is a value used for calculation by each layer included in the neural network, and may be used, for example, to apply an input value to a certain calculation formula. The weight is a value set as a result of training, and may be updated using separate training data when necessary.

A "current block" refers to a block to be currently processed. The current block may be a slice, a tile, a maximum coding unit, a coding unit, a prediction unit, or a transformation unit divided from a current image.

A "sample" corresponds to data assigned to a sampling location within data such as an image, a block, a filter kernel, or a feature map, and refers to data to be processed. For example, the sample may include a pixel within a two-dimensional image.

An image encoding and decoding process will now be described with reference to FIGS. 17 and 18 before describing an image processing apparatus and an image processing method performed by the image processing apparatus, according to an embodiment of the disclosure.

Figure 17:
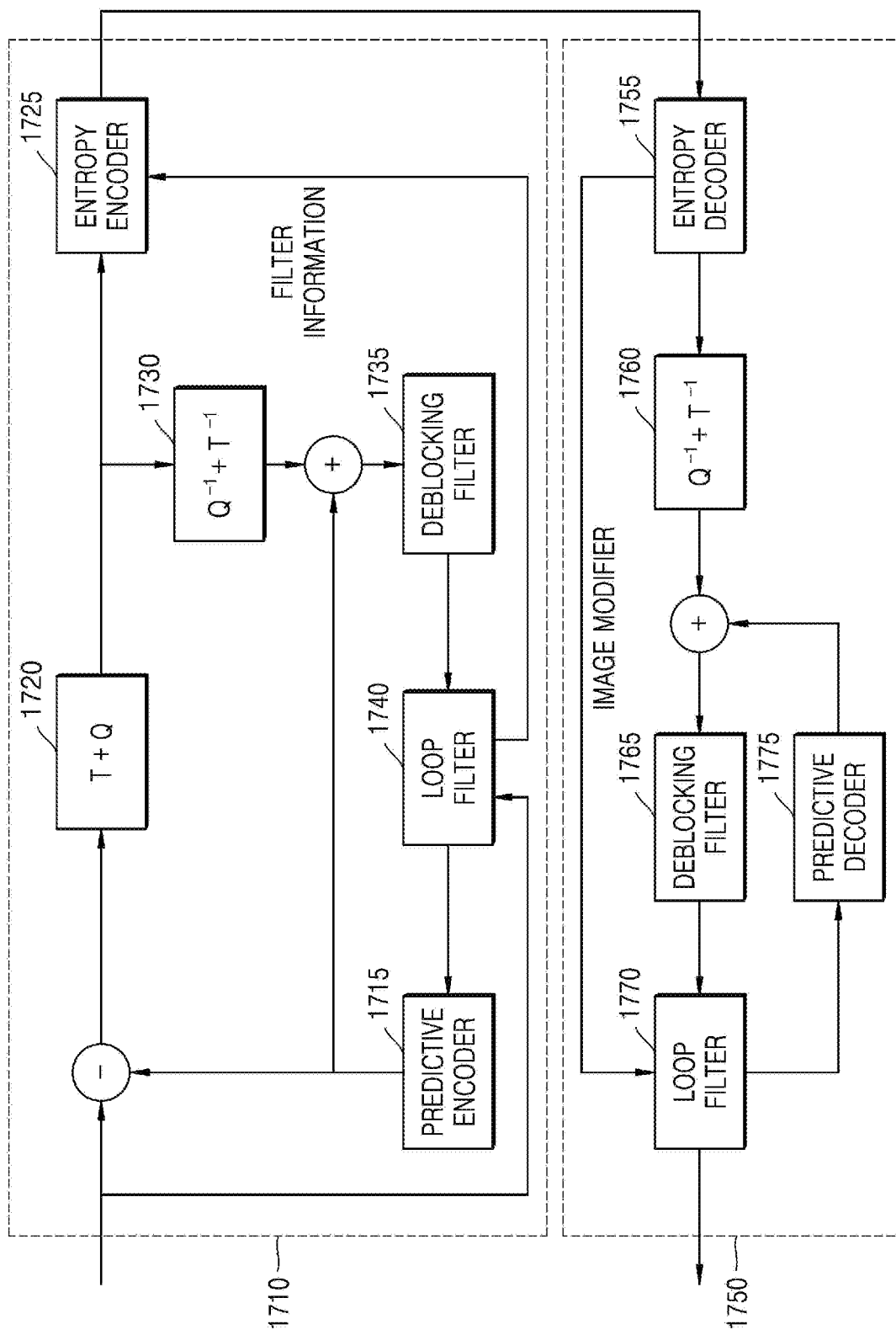
FIG. 17 is a diagram for describing an image encoding and decoding process.

FIG. 17 is a diagram for describing an image encoding and decoding process.

An encoding apparatus 1710 transmits, to a decoding apparatus 1750, a bitstream generated by encoding an image, and the decoding apparatus 1750 reconstructs an image by receiving and decoding the bitstream.

Specifically, in the encoding apparatus 1710, a predictive encoder 1715 outputs a predicted block through inter prediction and intra prediction, and a transformer and quantizer 1720 outputs quantized transformation coefficients by transforming and quantizing residual samples of a residual block between the predicted block and a current block. An entropy encoder 1725 outputs a bitstream by encoding the quantized transformation coefficients.

The quantized transformation coefficients are reconstructed into a residual block including residual samples of the spatial domain, through an inverse quantizer and inverse transformer 1730. A reconstructed block obtained by adding the predicted block and the residual block is output as a filtered block through a deblocking filter 1735 and a loop filter 1740. A reconstructed image including the filtered block may be used by the predictive encoder 1715 as a reference image of a next input image.

The bitstream received by the decoding apparatus 1750 is reconstructed into a residual block including residual samples of the spatial domain, through an entropy decoder 1755 and an inverse quantizer and inverse transformer 1760. A reconstructed block is generated by combining the residual block and a predicted block output from a predictive decoder 1775, and is output as a filtered block through a deblocking filter 1765 and a loop filter 1770. A reconstructed image including the filtered block may be used by the predictive decoder 1775 as a reference image for a next image.

The loop filter 1740 of the encoding apparatus 1710 performs loop filtering by using filter information input based on a user input or system settings. The filter information used by the loop filter 1740 is transmitted through the entropy encoder 1725 to the decoding apparatus 1750. The loop filter 1770 of the decoding apparatus 1750 may perform loop filtering based on the filter information input from the entropy decoder 1755.

In the image encoding and decoding process, an image is hierarchically divided, and encoding and decoding are performed on blocks divided from the image. The blocks divided from the image will now be described with reference to FIG. 18.

FIG. 18 is a diagram showing blocks divided from an image 1800 based on a tree structure.

One image 1800 may be divided into one or more slices or one or more tiles. One slice may include a plurality of tiles.

One slice or one tile may be a sequence of one or more maximum coding units (or maximum CUs).

One maximum coding unit may be divided into one or more coding units. The coding unit may be a reference block for determining a prediction mode. In other words, it may be determined whether an intra prediction mode or an inter prediction mode is applied to each coding unit. In the disclosure, the maximum coding unit may be referred to as a maximum coding block, and the coding unit may be referred to as a coding block.

The coding unit may have a size equal to or less than that of the maximum coding unit. The maximum coding unit is a coding unit having the maximum size, and thus may also be referred to as a coding unit.

One or more prediction units for intra prediction or inter prediction may be determined from the coding unit. The prediction unit may have a size equal to or less than that of the coding unit.

One or more transformation units for transformation and quantization may be determined from the coding unit. The transformation unit may have a size equal to or less than that of the coding unit. The transformation unit is a reference block for transformation and quantization, and residual samples of the coding unit may be transformed and quantized for each transformation unit within the coding unit.

In the disclosure, a current block may be a slice, a tile, a maximum coding unit, a coding unit, a prediction unit, or a transformation unit divided from the image 1800. A lower block of the current block is a block divided from the current block and, for example, when the current block is a maximum coding unit, the lower block may be a coding unit, a prediction unit, or a transformation unit. An upper block of the current block is a block including the current block as a part and, for example, when the current block is a maximum coding unit, the upper block may be a picture sequence, a picture, a slice, or a tile.

An image processing apparatus and an image processing method according to an embodiment of the disclosure will now be described with reference to FIGS. 1 to 16.

FIG. 1 is a block diagram of an image processing apparatus 100 according to an embodiment of the disclosure.

Referring to FIG. 1, the image processing apparatus 100 may include a decoder 110 and an artificial intelligence (AI) filter 130.

The AI filter 130 may include a quantization error calculator 132, an AI-based image processor 134, an image analyzer 136, and an image modifier 138.

The decoder 110 and the AI filter 130 may be implemented as one or more processors. The decoder 110 and the AI filter 130 may operate based on instructions stored in a memory.

Although the decoder 110 and the AI filter 130 are separately illustrated in FIG. 1, the decoder 110 and the AI filter 130 may be implemented as one processor. In this case, the decoder 110 and the AI filter 130 may be implemented as a dedicated processor or a combination of software and a general-purpose processor, such as an application processor (AP), a central processing unit (CPU), or a graphics processing unit (GPU). The dedicated processor may include a memory for implementing an embodiment of the disclosure, or a memory processor for using an external memory.

The decoder 110 and the AI filter 130 may be configured as a plurality of processors. In this case, the decoder 110 and the AI filter 130 may be implemented as a combination of dedicated processors or a combination of software and a plurality of general-purpose processors, such as APs, CPUs, or GPUs.

The decoder 110 may reconstruct a current block by decoding encoded data. The encoded data may be generated as a result of encoding an original block within an original image.

In an embodiment of the disclosure, the decoder 110 may include the inverse quantizer and inverse transformer 1730 and the predictive encoder 1715 illustrated in FIG. 17. In another embodiment of the disclosure, the decoder 110 may include the inverse quantizer and inverse transformer 1760 and the predictive decoder 1775 illustrated in FIG. 17.

The encoded data may include syntax elements generated by encoding the original block.

For example, the encoded data may correspond to data input to the entropy encoder 1725 illustrated in FIG. 17. Alternatively, for example, the encoded data may correspond to data output from the entropy decoder 1755.

In an embodiment of the disclosure, the image processing apparatus 100 may be the encoding apparatus 1710 or the decoding apparatus 1750 illustrated in FIG. 17.

When the image processing apparatus 100 is the encoding apparatus 1710, the image processing apparatus 100 may generate a bitstream by entropy-encoding the encoded data, and transmit the bitstream to the decoding apparatus 1750. When the image processing apparatus 100 is the decoding apparatus 1750, the image processing apparatus 100 may obtain encoded data by entropy-decoding the bitstream received from the encoding apparatus 1710.

In an embodiment of the disclosure, the encoded data may correspond to a bitstream.

The current block reconstructed by the decoder 110 may be input to the AI filter 130.

In an embodiment of the disclosure, the current block reconstructed by the decoder 110 may be transmitted to the AI-based image processor 134, and a quantization parameter included in the encoded data may be transmitted from the decoder 110 to the quantization error calculator 132.

In an embodiment of the disclosure, the current block reconstructed by the decoder 110 may be processed using one or more predetermined filtering algorithms before being input to the AI filter 130, and then input to the AI filter 130. For example, the current block reconstructed by the decoder 110 may be processed by a deblocking filter, and then input to the AI filter 130.

The AI filter 130 outputs a filtered block by applying AI-based filtering to the current block. As illustrated in FIG. 1, the filtered block may be a second modified block.

In an embodiment of the disclosure, the second modified block output from the AI filter 130 may be processed using one or more predetermined filtering algorithms. For example, the second modified block may be processed by a sample adaptive offset (SAO) filter, and then output.

The quantization error calculator 132 may generate a quantization error map based on the quantization parameter received from the decoder 110.

The quantization error map may include sample values calculated based on the quantization parameter. The quantization error map may have a size equal to the size of the current block.

In an embodiment of the disclosure, the quantization error map may include, as the sample values, quantization error values calculated based on the quantization parameter.

The quantization error values may indicate the amounts of errors which may be caused by quantization and inverse quantization applied to residual samples when the original block is encoded and decoded.

A large quantization error value may indicate a large difference between a transformation coefficient before quantization and a transformation coefficient after inverse quantization. When the difference between the transformation coefficient before quantization and the transformation coefficient after inverse quantization is large, the identity between the original block and the current block obtained by decoding the encoded data may be reduced.

Because errors caused by quantization and inverse quantization correspond to artifacts, AI-based filtering needs to be performed considering the quantization error values.

In an embodiment of the disclosure, the quantization error value may be calculated using Equation 1.

$$\text{Quantization Error Value} = \text{Quantization Step Size}^2/12 \quad \text{[Equation 1]}$$

Referring to Equation 1, the quantization error value may be proportional to a square of the quantization step size.

The quantization step size is a value used for quantization of the transformation coefficient, and the transformation coefficient may be quantized by dividing the transformation coefficient by the quantization step size. On the other hand, the quantized transformation coefficient may be inverse-quantized by multiplying the quantized transformation coefficient by the quantization step size.

The quantization step size may be approximated using Equation 2.

$$\text{Quantization Step Size} = 2^{(\text{Quantization Parameter}/n)}/\text{Quantization Scale}[\text{Quantization Parameter}/\text{on}] \quad \text{[Equation 2]}$$

In Equation 2, Quantization Scale[Quantization Parameter/on] denotes a scale value indicated by the quantization parameter from among n predetermined scale values. Because the High Efficiency Video Coding (HEVC) codec defines six scale values (i.e., 26214, 23302, 20560, 18396, 16384, and 14564), n is 6 according to the HEVC codec.

Referring to Equations 1 and 2, when the quantization parameter is increased, the quantization step size may be increased and the quantization error value may also be increased.

Depending on implementation, in embodiments of the disclosure, the quantization error calculator 132 may generate a quantization error map which includes, as a sample value, a quantization step size calculated based on the quantization parameter.

In an embodiment of the disclosure, when one quantization parameter is set for the current block or an upper block of the current block, samples of the quantization error map may have equal sample values calculated based on the one quantization parameter.

In another embodiment of the disclosure, when the quantization parameter is set for each of lower blocks of the current block, the quantization error calculator 132 may calculate sample values of each lower block based on the quantization parameters corresponding to the lower blocks of the current block.

The case in which the quantization parameter is set for each of the lower blocks will now be described with reference to FIG. 2.

Figure 2:
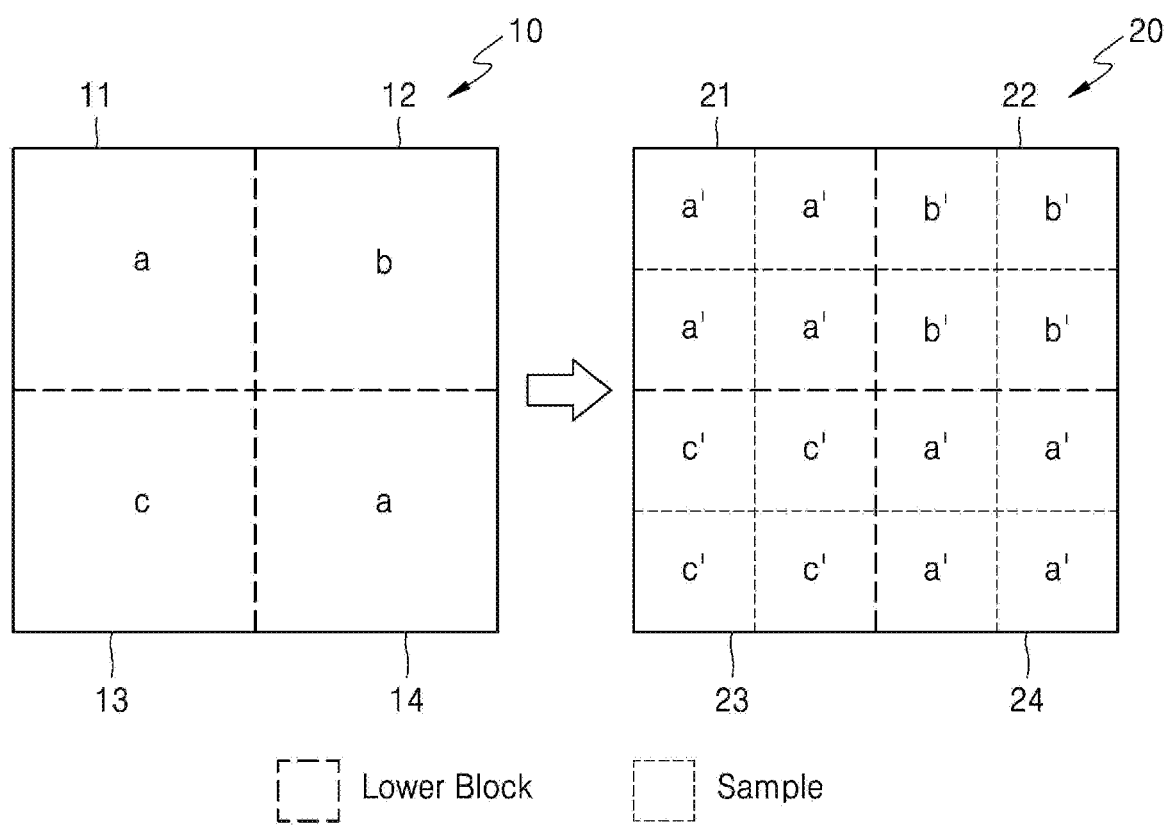
FIG. 2 is a diagram showing a quantization error map generated based on quantization parameters for lower blocks of a current block, according to an embodiment of the disclosure.

FIG. 2 is a diagram showing a quantization error map 20 generated based on quantization parameters for lower blocks, a first lower block 11, a second lower block 12, a third lower block 13, and a fourth lower block 14, of a current block 10, according to an embodiment of the disclosure.

The current block 10 may be divided into the first lower block 11, the second lower block 12, the third lower block 13, and the fourth lower block 14. Each of the first lower block 11, the second lower block 12, the third lower block 13, and the fourth lower block 14 may correspond to a transformation unit.

Referring to FIG. 2, when quantization parameters a, b, c, and a are respectively set for a first lower block 11, a second lower block 12, a third lower block 13, and a fourth lower block 14 of the current block 10, samples of a first block 21, a second block 22, a third block 23, and a fourth block 24 of the quantization error map 20, which correspond to the first to the fourth lower blocks 11 to 14, may have sample values a', b', c', and a' calculated based on the quantization parameters a, b, c, and a.

In an embodiment of the disclosure, the sample values a', b', c', and a' may correspond to quantization error values calculated based on Equations 1 and 2 shown above. In another embodiment of the disclosure, the sample values a', b', c', and a' may correspond to quantization step sizes calculated based on Equation 2 shown above.

When a quantization parameter is set for each of the first lower block 11, the second lower block 12, the third lower block 13, and the fourth lower block 14 of the current block 10, it may be understood that the quantization error calculator 132 generates the quantization error map 20 representing differences between lower blocks of an original block and the first lower block 11, the second lower block 12, the third lower block 13, and the fourth lower block 14 of the current block 10.

Although the current block 10 is divided into four lower blocks 11, 12, 13, and 14 in FIG. 2, four is merely an example, and the current block 10 may be divided into various numbers of (e.g., one, two, four, and eight) various-sized lower blocks.

Referring back to FIG. 1, the current block and the quantization error map are transmitted to the AI-based image processor 134.

The AI-based image processor 134 may obtain a first modified block by applying the current block and the quantization error map to a neural network, and transmit the first modified block to the image modifier 138.

Depending on implementation, the AI-based image processor 134 may obtain the first modified block by applying a predicted block and/or a residual block used to reconstruct the current block, to the neural network together with the current block and the quantization error map.

The neural network used by the AI-based image processor 134 may be stored in a memory. Depending on implementation, the neural network may be implemented as an AI processor.

The neural network for processing the current block and the quantization error map will now be described with reference to FIG. 3.

Figure 3:
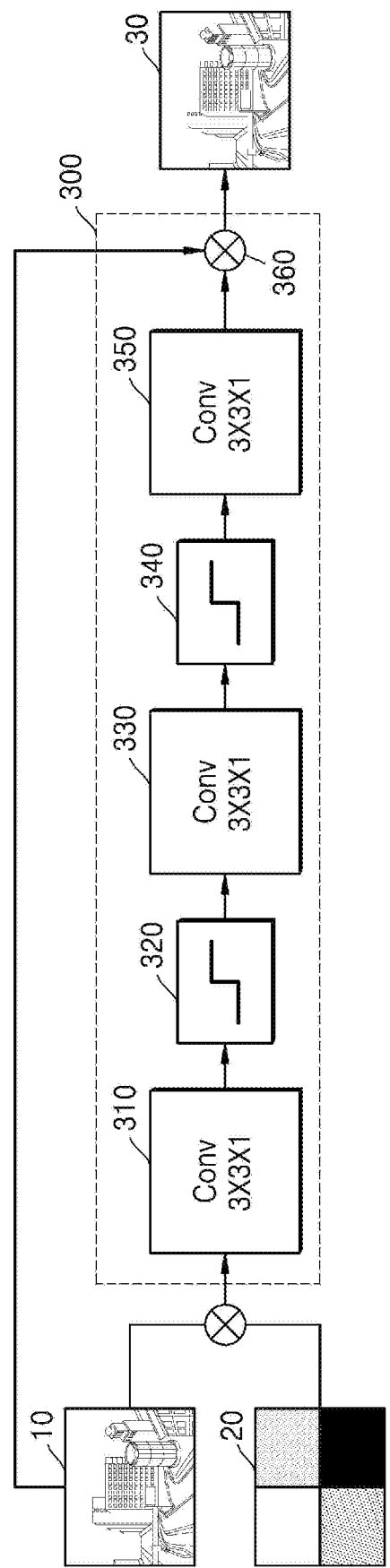
FIG. 3 is a block diagram of a neural network according to an embodiment of the disclosure.

FIG. 3 is a block diagram of a neural network 300 according to an embodiment of the disclosure.

As illustrated in FIG. 3, the neural network 300 may include a first convolutional layer 310, a first activation layer 320, a second convolutional layer 330, a second activation layer 340, a third convolutional layer 350, and a summation layer 360. The summation layer 360 may also be referred to as an adder.

The current block 10 and the quantization error map 20 are input to the first convolutional layer 310. The current block 10 and the quantization error map 20 may be concatenated and then input to the first convolutional layer 310. Like the quantization error map 20 illustrated in FIG. 2, the quantization error map 20 illustrated in FIG. 3 may be divided into four blocks having different sample values.

3×3×1 indicated on the first convolutional layer 310 represents that convolution is performed on the current block 10 and the quantization error map 20 by using one filter kernel having a size of 3×3. One feature map is generated by the one filter kernel as the result of performing convolution.

The feature map generated by the first convolutional layer 310 may represent unique features of the current block 10 and the quantization error map 20. For example, the feature map may represent vertical direction features, horizontal direction features, or edge features of the current block 10 and the quantization error map 20.

The feature map output from the first convolutional layer 310 is input to the first activation layer 320.

The first activation layer 320 may give non-linearity to the feature map. The first activation layer 320 may include a sigmoid function, a hyperbolic tangent (tanh) function, a rectified linear unit (ReLU) function, or the like, but is not limited thereto.

When the first activation layer 320 gives non-linearity to the feature map, it may mean that some sample values of the feature map are changed and output. In this case, the sample values may be changed by applying non-linearity.

The first activation layer 320 may determine whether to transmit sample values of the feature map to the second convolutional layer 330. For example, some sample values of the feature map may be activated by the first activation layer 320 and transmitted to the second convolutional layer 330, and the other sample values may be inactivated by the first activation layer 320 and not transmitted to the second convolutional layer 330. The unique features of the current block 10 and the quantization error map 20, which are represented by the feature map, may be emphasized by the first activation layer 320.

The feature map output from the first activation layer 320 is input to the second convolutional layer 330.

3×3×1 indicated on the second convolutional layer 330 represents that convolution is performed on the input feature map by using one filter kernel having a size of 3×3. The output of the second convolutional layer 330 is input to the second activation layer 340. The second activation layer 340 may give non-linearity to the input feature map.

The feature map output from the second activation layer 340 is input to the third convolutional layer 350. 3×3×1 indicated on the third convolutional layer 350 represents that convolution is performed to generate one feature map by using one filter kernel having a size of 3×3.

The feature map output from the third convolutional layer 350 is added to the current block 10 by the summation layer 360, and a first modified block 30 is output as the result of addition.

Because the first modified block 30 is obtained when the feature map output from the third convolutional layer 350 is added to the current block 10, the feature map output from the third convolutional layer 350 may be referred to as a first differential block between the current block 10 and the first modified block 30.

Because the neural network 300 illustrated in FIG. 3 includes the summation layer 360, the AI-based image processor 134 may obtain the first modified block 30 from the neural network 300. When the neural network 300 does not include the summation layer 360, the AI-based image processor 134 may obtain the first differential block from the neural network 300. An image processing apparatus 1600, which uses a neural network not including the summation layer 360, will be described below with reference to FIG. 16.

Although the neural network 300 includes three convolutional layers, a first convolutional layer 310, a second convolutional layer 330, and a third convolutional layer 350, and the first and the second activation layers 320 and 340 in FIG. 3, three and two are merely examples and, depending on implementation, the numbers of convolutional layers and activation layers included in the neural network 300 may be variously changed.

Furthermore, depending on implementation, the neural network 300 may be implemented as a recurrent neural network (RNN). This case means that the neural network 300 according to an embodiment of the disclosure is changed from a convolutional neural network (CNN) structure to an RNN structure.

In addition, depending on implementation, before the current block 10 and the quantization error map 20 are input to the first convolutional layer 310, the current block 10 may be processed by one or more convolutional layers and, separately, the quantization error map 20 may be processed by one or more convolutional layers. The current block 10 and the quantization error map 20, which are individually processed by different convolutional layers, may be input to the first convolutional layer 310.

In an embodiment of the disclosure, the image processing apparatus 100 may include at least one arithmetic logic unit (ALU) for the above-described convolution operation and activation layer operation.

The ALU may be implemented as a processor. For the convolution operation, the ALU may include a multiplier for multiplying sample values of input data (e.g., the current block 10 and the quantization error map 20) by sample values of a filter kernel, and an adder for adding the resultant values of multiplication.

For the activation layer operation, the ALU may include a multiplier for multiplying an input sample value by a weight used for a predetermined sigmoid, tanh, or ReLU function, and a comparator for comparing the result of multiplication to a certain value to determine whether to transmit the input sample value to a next layer.

Referring back to FIG. 1, the image analyzer 136 may analyze features of the current block or an upper block of the current block, which is reconstructed by the decoder 110. When the features of the upper block need to be analyzed, the upper block reconstructed by the decoder 110 may be provided to the image analyzer 136.

In an embodiment of the disclosure, the image analyzer 136 may obtain a feature value as the result of analyzing the current block or the upper block.

In an embodiment of the disclosure, the feature value may be obtained based on at least one of:
i) a sum of squares of residual sample values obtained to reconstruct the current block or the upper block;
ii) an average of the squares of the residual sample values obtained to reconstruct the current block or the upper block;

iii) a maximum value from among the residual sample values obtained to reconstruct the current block or the upper block;

iv) a maximum value from among absolute values of the residual sample values obtained to reconstruct the current block or the upper block;

v) the number of non-zero (0) transformation coefficients from among transformation coefficients (e.g., inverse-transformed transformation coefficients) corresponding to the residual samples obtained to reconstruct the current block or the upper block;

vi) a value indicating the type of a slice corresponding to the current block, e.g., a value indicating whether the slice including the current block is an intra (I) slice, a predictive (P) slice, or a bi-predictive (B) slice;

vii) a ratio between an area of a block to which intra prediction is applied and an area of a block to which inter prediction is applied, in the current block or the upper block;

viii) a sharpness of the current block or the upper block, e.g., a value calculated based on at least one of a standard deviation, an edge width, or a gradient of the sample values;

ix) an average of one or more quantization step sizes calculated based on one or more quantization parameters set for the current block or the upper block; or x) an average of one or more quantization error values calculated based on the one or more quantization parameters set for the current block or the upper block.

The values corresponding to i), ii), iii), iv), and v) described above represent how high energy of the residual samples within the current block or the upper block to be quantized and inverse-quantized is. When the energy of the residual samples is high, a probability that errors are caused by quantization and inverse quantization may increase.

Furthermore, when the sharpness of the current block or the upper block is high, because a probability that errors exist in the current block obtained by encoding/decoding the original block may be high, it may be predicted how many errors exist in the current block, based on the value corresponding to viii).

In addition, because the values corresponding to ix) and x) are directly related to the amount of errors caused by quantization, it may be predicted how many errors exist in the current block, based on the values corresponding to ix) and x).

Depending on implementation, the image analyzer 136 may obtain the feature value by combining two or more of the values corresponding to i) to x). Multiplication and/or addition may be used to combine the two or more values.

When the feature value of the current block or the upper block is obtained, the image analyzer 136 may determine a parameter based on the feature value, and provide the determined parameter to the image modifier 138.

The parameter may include a scale factor and/or a clipping factor. The scale factor and the clipping factor will be described below.

The image modifier 138 may obtain a first differential block between the current block and the first modified block. Because the neural network 300 including the summation layer 360, which is described above in relation to FIG. 3, ultimately outputs the first modified block 30, the image modifier 138 may obtain the first differential block by subtracting the current block from the first modified block.

The image modifier 138 may obtain a second differential block by changing sample values of the first differential block based on the parameter. The image modifier 138 may obtain the second modified block by adding the second differential block and the current block.

The image modifier 138 will now be described with reference to FIG. 4.

Figure 4:
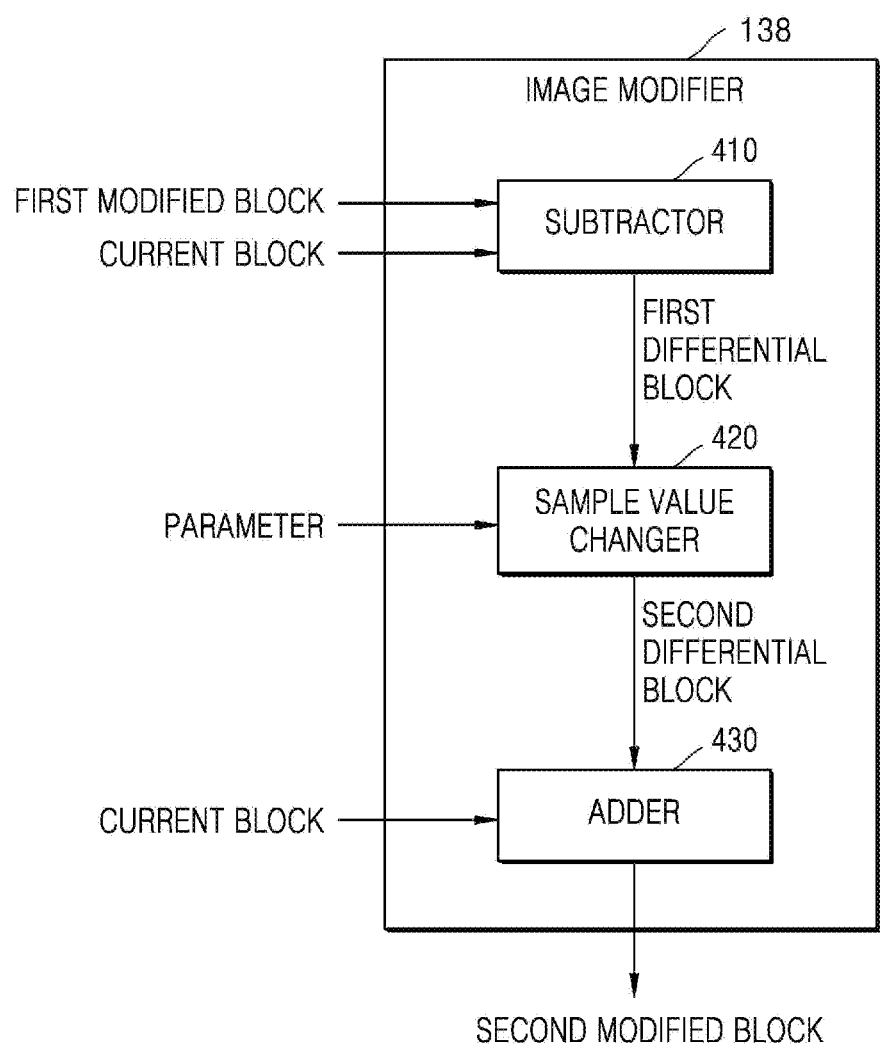
FIG. 4 is a block diagram of an image modifier according to an embodiment of the disclosure.

FIG. 4 is a block diagram of the image modifier 138 according to an embodiment of the disclosure.

Referring to FIG. 4, the image modifier 138 may include a subtractor 410, a sample value changer 420, and an adder 430.

The subtractor 410 may receive the current block and the first modified block, and output a first differential block corresponding to a difference between the current block and the first modified block. In an embodiment of the disclosure, the subtractor 410 may obtain sample values of the first differential block by subtracting sample values of the current block from sample values of the first modified block.

The sample value changer 420 may output the second differential block by changing the sample values of the first differential block based on the parameter provided from the image analyzer 136.

In an embodiment of the disclosure, when the parameter corresponds to a scale factor, the sample value changer 420 may obtain sample values of the second differential block by multiplying the sample values of the first differential block by the scale factor.

In another embodiment of the disclosure, when the parameter corresponds to a clipping factor, the sample value changer 420 may obtain sample values of the second differential block by limiting the sample values of the first differential block to values between an upper limit and a lower limit identified based on the clipping factor.

In still another embodiment of the disclosure, when the parameter includes a scale factor and a clipping factor, the sample value changer 420 may obtain sample values of the second differential block by multiplying the sample values of the first differential block by the scale factor, and limiting the sample values of the first differential block, which are multiplied by the scale factor, to values between upper and lower limits identified based on the clipping factor.

In still another embodiment of the disclosure, when the parameter includes a scale factor and a clipping factor, the sample value changer 420 may obtain sample values of the second differential block by limiting the sample values of the first differential block to values between upper and lower limits identified based on the clipping factor, and multiplying the sample values of the first differential block, which are limited based on the clipping factor, by the scale factor.

The adder 430 may output the second modified block by adding the current block and the second differential block.

In an embodiment of the disclosure, the reason why the image modifier 138 changes the sample values of the first differential block based on the parameter is that the first differential block corresponds to a result processed by convolutional layers. Because the convolutional layers process input data based on a weight preset through training, they have no choice but to process the input data for a predetermined purpose of training.

In the disclosure, by modifying the output data of the convolutional layers operating based on the weight set through training, i.e., the first differential block, based on the parameter dependent on the features of the current block, the current block may be filtered appropriately for the features of the current block.

Depending on implementation, the image modifier 138 may obtain the second modified block by changing the sample values of the first modified block based on the parameter.

In an embodiment of the disclosure, the image analyzer 136 illustrated in FIG. 1 may select the parameter to be applied to the first differential block from among one or more candidate parameters based on a result of comparing a feature value of the current block or the upper block to a threshold value.

FIG. 5 is a table showing correspondences between candidate parameters and features of a block, according to an embodiment of the disclosure, and the correspondences may be pre-stored in the image processing apparatus 100.

In an embodiment of the disclosure, the candidate parameters may be obtained from the encoded data for the current block or the upper block. When the candidate parameters are obtained for the upper block, the same candidate parameters may be used for lower blocks included in the upper block.

As shown in FIG. 5, the image analyzer 136 may select a candidate parameter 'a' as the parameter to be applied to the first differential block, when a feature value of the current block or the upper block is less than a first threshold value, or select a candidate parameter 'b' as the parameter to be applied to the first differential block, when the feature value is greater than or equal to the first threshold value and less than a second threshold value. The image analyzer 136 may select a candidate parameter 'c' as the parameter to be applied to the first differential block, when the feature value is greater than the second threshold value.

Although three candidate parameters are shown in FIG. 5, three is merely an example, and the number of candidate parameters may be variously determined and the condition corresponding to each candidate parameter may also be variously set.

In an embodiment of the disclosure, the candidate parameters shown in FIG. 5 may be included in a parameter set selected from among one or more parameter sets.

FIG. 6 is a table showing correspondences between parameter sets and features of a block, according to an embodiment of the disclosure, and the correspondences may be pre-stored in the image processing apparatus 100.

In an embodiment of the disclosure, the parameter sets may be obtained from the encoded data. For example, the parameter sets may be included in a sequence parameter set of the encoded data or the bitstream.

FIG. 6 also shows candidate parameters included in each parameter set, and a parameter set may include the candidate parameters 'a', 'b', and 'c' shown in FIG. 5, a parameter set 'Q' may include candidate parameters 'd' and 'e', and a parameter set 'R' may include candidate parameters 'a', 'g', and 'h'.

As shown in FIG. 6, the image analyzer 136 may select the parameter set when a feature value of the current block or the upper block is less than a third threshold value, or select the parameter set 'Q' when the feature value is greater than or equal to the third threshold value and less than a fourth threshold value. The image analyzer 136 may select the parameter set 'R' when the feature value is greater than the fourth threshold value.

For example, the image analyzer 136 may select the parameter set when the feature value is less than the third threshold value, and further select the candidate parameter 'a' for the first differential block when the feature value is less than the first threshold value shown in FIG. 5, or select the candidate parameter 'b' when the feature value is greater than or equal to the first threshold value and less than the second threshold value.

In an embodiment of the disclosure, the number of candidate parameters included in a parameter set (e.g., the parameter set 'P') may differ from the number of candidate parameters included in another parameter set (e.g., the parameter set 'Q'). Some of candidate parameters included in a parameter set (e.g., the parameter set 'P') may be the same as some of candidate parameters included in another parameter set (e.g., the parameter set 'R').

Although three parameter sets are shown in FIG. 6, three is merely an example, and the number of parameter sets may be variously determined and the condition corresponding to each parameter set may also be variously set.

Depending on implementation, the feature value used to select one of one or more parameter sets may be calculated in a different manner from the feature value used to select one of one or more candidate parameters. For example, the feature value used to select one of the one or more parameter sets may be calculated based on the above-described value corresponding to i), and the feature value used to select one of the one or more candidate parameters may be calculated based on the value corresponding to v).

In an embodiment of the disclosure, the parameter set may be selected for the upper block of the current block, and the parameter may be selected for the current block. For example, when the current block is a maximum coding unit and the upper block is a slice, one of the one or more parameter sets may be selected for the slice, and one of the candidate parameters included in the selected parameter set may be selected for each maximum coding unit within the slice.

In another embodiment of the disclosure, the parameter set may be selected for a first upper block, and the parameter may be selected for a second upper block. For example, when the current block is a maximum coding unit, the first upper block is a picture sequence, and the second upper block is a slice, one of the one or more parameter sets may be selected for the picture sequence, and one of the candidate parameters included in the selected parameter set may be selected for each slice within the picture sequence. The same parameter may be applied to maximum coding units within the slice.

In still another embodiment of the disclosure, the parameter set may be selected based on first information included in the encoded data. The first information may be an index or flag indicating one of the one or more parameter sets. In an embodiment of the disclosure, the first information may be obtained from at least one of a sequence parameter set, a picture parameter set, a slice header, or slice data of the encoded data (or the bitstream).

In still another embodiment of the disclosure, the parameter may be selected based on second information included in the encoded data. The second information may be an index or flag indicating one of the one or more parameter sets. In an embodiment of the disclosure, the second information may be obtained from at least one of a sequence parameter set, a picture parameter set, a slice header, or slice data of the encoded data (or the bitstream).

Depending on implementation, one of the one or more candidate parameters included in the parameter set indicated by the first information may be selected based on the feature value of the current block or the upper block. As another example, one of the one or more parameter sets may be selected based on the feature value of the current block or the upper block, and one of the one or more candidate parameters included in the selected parameter set may be selected based on the second information.

In an embodiment of the disclosure, when the parameter for the first differential block is selected based on the first information and the second information, the image analyzer 136 illustrated in FIG. 1 may be excluded from the AI filter 130. The image analyzer 136 may be excluded because the feature value of the current block or the upper block is not used to select the parameter to be applied to the first differential block.

In an embodiment of the disclosure, the first information may be included in the encoded data for the upper block, and the second information may be included in the encoded data for the current block. When the upper block is a slice and the current block is a maximum coding unit, the first information may be included in a slice header of the bitstream, and the second information may be included in slice data of the bitstream.

In another embodiment of the disclosure, the first information may be included in the encoded data for the first upper block, and the second information may be included in the encoded data for the second upper block. When the first upper block is a picture sequence or a picture and the second upper block is a slice, the first information may be included in a sequence parameter set or a picture parameter set, and the second information may be included in a slice header.

The scale factor and the clipping factor will now be described in more detail.

The scale factor is a value applied to the sample values of the first differential block and may include, for example, a value to be multiplied by the sample values of the first differential block.

FIG. 7 is a table showing a plurality of scale factor sets according to an embodiment of the disclosure.

As shown in FIG. 7, each scale factor set may include one or more candidate scale factors. For example, a first set may include candidate scale factors of 1, 0.75, 0.5, and 0.25, and a second set may include candidate scale factors of 1, 0.75, 1.25, and 0.5.

As described above, one of a plurality of scale factor sets may be selected based on a feature value or information included in encoded data, and one of candidate scale factors included in the selected scale factor set may be selected based on a feature value or information included in the encoded data.

The image modifier 138 may generate the second differential block by applying, to the sample values of the first differential block, the scale factor selected by the image analyzer 136.

Subsequently, the clipping factor is a value for clipping the sample values of the first differential block.

For example, the image modifier 138 may clip the sample values of the first differential block based on Equation 3.

$$\mathrm{Clip}(p) = \mathrm{clip}(X, p, Y) \quad \text{[Equation 3]}$$

In Equation 3, p denotes the sample values of the first differential block, X denotes a lower limit, and Y denotes an upper limit. In Equation 3, p is output when p has a value between X and Y, X is output when p is less than X, and Y is output when p is greater than Y.

The image analyzer 136 may determine the values X and Y based on the clipping factor for the first differential block.

For example, the image analyzer 136 may determine the clipping factor as the value X, and determine the value Y by switching the sign of the value X.

As another example, the image analyzer 136 may determine the clipping factor as the value Y, and determine the value X by switching the sign of the value Y.

As still another example, when the clipping factor includes a set of the values X and Y, the image analyzer 136 may perform clipping by using the values X and Y included in the clipping factor.

As still another example, the image analyzer 136 may calculate the values X and Y by using at least one of the above-described values corresponding to i) to x). For example, the image analyzer 136 may determine one of the values X and Y by multiplying a quantization parameter, a quantization step size, or a quantization error value by a residual sample value obtained to reconstruct a current block or an upper block (e.g., a maximum value from among absolute values of residual sample values). Then, the image analyzer 136 may determine the other of the values X and Y by switching the sign of the one of the values X and Y.

Meanwhile, according to the disclosure, AI-based filtering is applied to each of blocks included in an image and then the blocks to which AI-based filtering is applied configure one reconstructed image, and artifacts may occur at boundaries between the blocks because AI-based filtering is applied to each block.

For example, when AI-based filtering is applied to each of maximum coding units divided from the image 1800 illustrated in FIG. 18, continuity between the maximum coding units within a reconstructed image may be reduced.

In an embodiment of the disclosure, the AI-based image processor 134 may prevent the reduction in continuity between blocks by applying, to the neural network 300, an extended block including samples within the current block and samples located outside a boundary of the current block.

A general convolution process will now be described with reference to FIG. 8 before describing how to determine the extended block.

Figure 8:
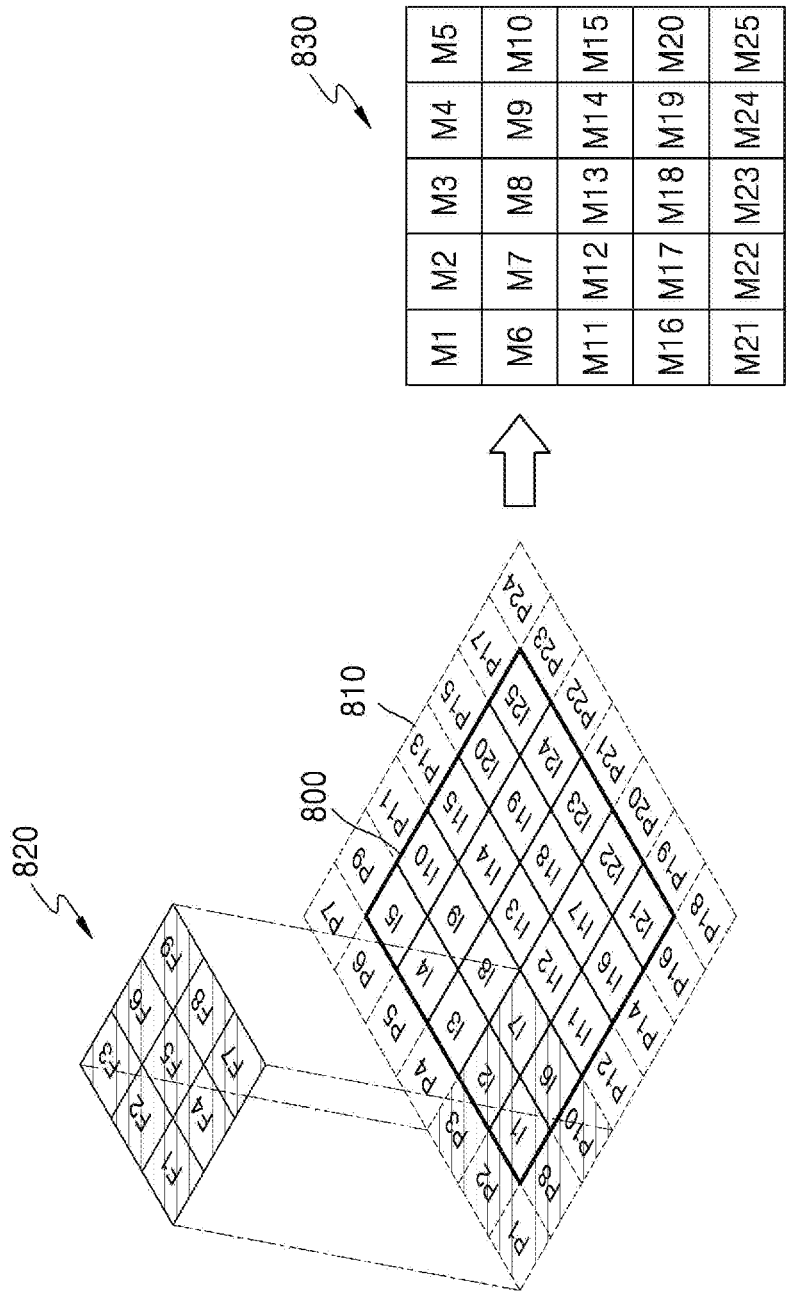
FIG. 8 is a diagram for describing a general convolution process.

FIG. 8 is a diagram for describing a general convolution process.

Figure 11:
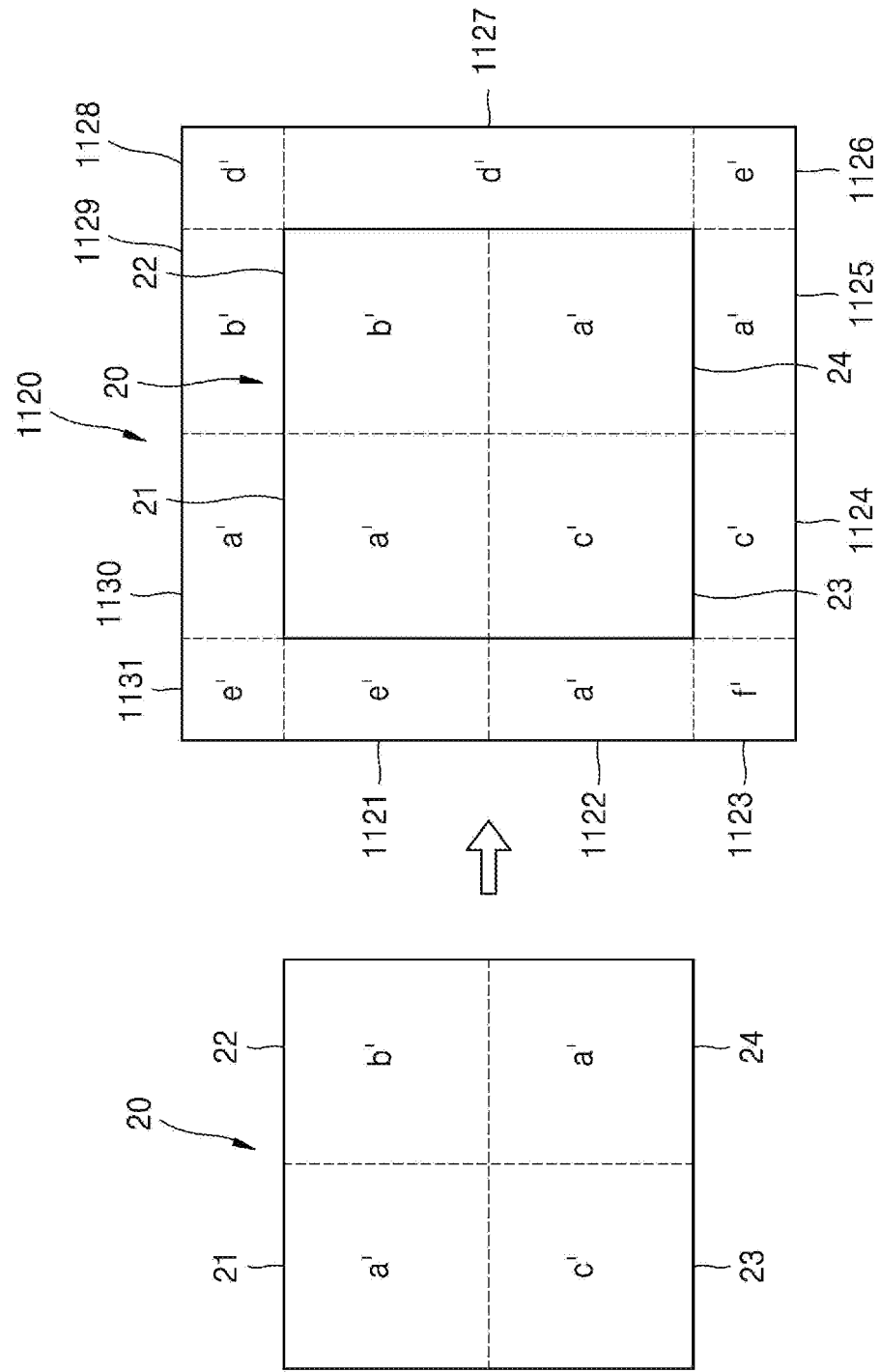
FIG. 11 is a diagram showing an extended quantization error map corresponding to an extended block, according to an embodiment of the disclosure.

In FIGS. 8, 11 to 125 indicated on a block 800 represent samples of the block 800, and F1 to F9 indicated on a filter kernel 820 represent weights of the filter kernel 820. M1 to M9 indicated on a feature map 830 represent samples of the feature map 830. Samples P1 to P24 adjacent to the block 800 are samples determined by padding the block 800 (hereinafter, referred to as padded samples 810). In general, the padded samples 810 may have values of 0.

In a convolution process, the sample values of P1, P2, P3, P8, I1, 12, P10, 16, and 17 may be respectively multiplied by F1, F2, F3, F4, F5, F6, F7, F8, and F9 of the filter kernel 820, and a value obtained by combining (e.g., adding) the resultant values of multiplication may be assigned as the value of M1 of the feature map 830.

When the stride of convolution is 1, the sample values of P2, P3, P4, I1, 12, 13, 16, 17, and 18 may be respectively multiplied by F1, F2, F3, F4, F5, F6, F7, F8, and F9 of the filter kernel 820, and a value obtained by combining the resultant values of multiplication may be assigned as the value of M2 of the feature map 830.

By performing convolution between the samples of the block 800 and the padded samples 810, and the weights of the filter kernel 820 while the filter kernel 820 moves based on the stride until F9 of the filter kernel 820 reaches the padded sample P24, the feature map 830 having the same size as the block 800 may be obtained.

In general, when convolution is performed on the block 800 that is not padded, the feature map 830 having a smaller size than the block 800 is output. When the size of the filter kernel 820 is 3×3, as illustrated in FIG. 8, to obtain the feature map 830 having the same size as the block 800, padding needs to be performed by a sample distance of 1 in left, right, top and bottom directions of the block 800 When the size of the filter kernel 820 is 5×5, to obtain the feature map 830 having the same size as the block 800, padding needs to be performed by a sample distance of 2 in left, right, top and bottom directions of the block 800.

Figure 9:
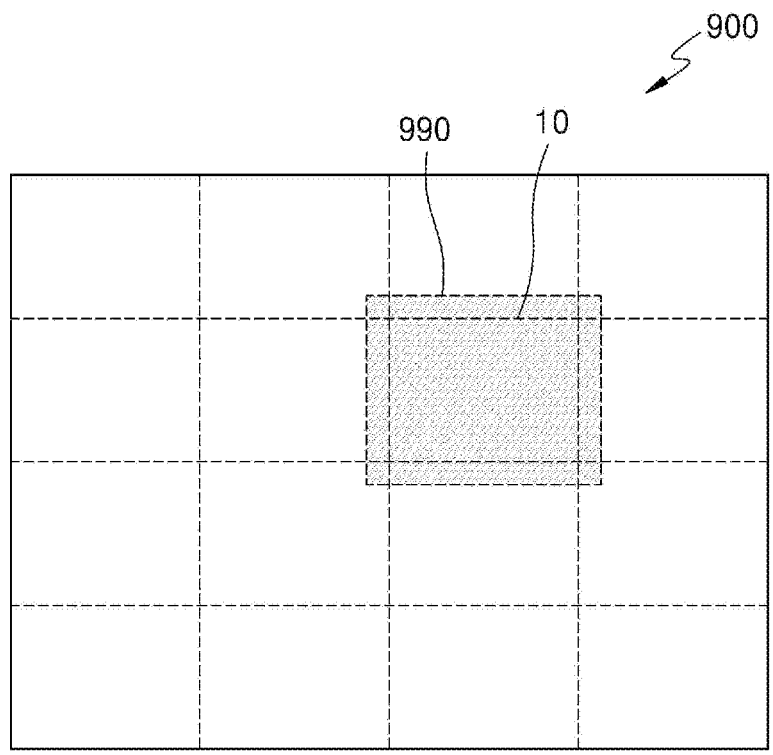
FIG. 9 is a diagram showing an extended block within a current image, according to an embodiment of the disclosure.

According to the disclosure, to obtain the first modified block having the same size as the current block, instead of padding the current block, an extended block 990 having a larger size than a current block 10 within a current image 900 illustrated in FIG. 9 may be used. Herein, samples located outside a boundary of the current block 10 are samples included in the current image 900. That is, by using the samples adjacent to the current block 10 instead of padding the current block 10, a probability that artifacts occur between blocks is reduced.

The AI-based image processor 134 needs to determine an appropriate size of the extended block in such a manner that the first modified block having the same size as the current block may be output from the neural network 300.

The AI-based image processor 134 according to an embodiment of the disclosure may calculate an extension distance considering the number of convolutional layers included in the neural network 300, and a size of a filter kernel used by each convolutional layer. The AI-based image processor 134 may determine the extended block including samples within the current block, and samples corresponding to the extension distance from among neighboring samples outside the boundary of the current block.

In an embodiment of the disclosure, when the size of the filter kernel used by a convolutional layer is n×n, the extension distance required by the n×n filter kernel may be calculated as (n−1)/2. Herein, n may be an odd number.

When a convolutional layer uses a plurality of filter kernels, the extension distance may be calculated on the basis of a largest filter kernel from among the plurality of filter kernels.

When the neural network 300 includes three convolutional layers and when filter kernels used by the three convolutional layers equally have a size of 3×3 as illustrated in FIG. 3, the AI-based image processor 134 may determine the extension distance to be 3(=1+1+1). When filter kernels used by two of the three convolutional layers have a size of 5×5 and when a filter kernel used by the other convolutional layer has a size of 3×3, the AI-based image processor 134 may determine the extension distance to be 5(=2+2+1).

Figure 10:
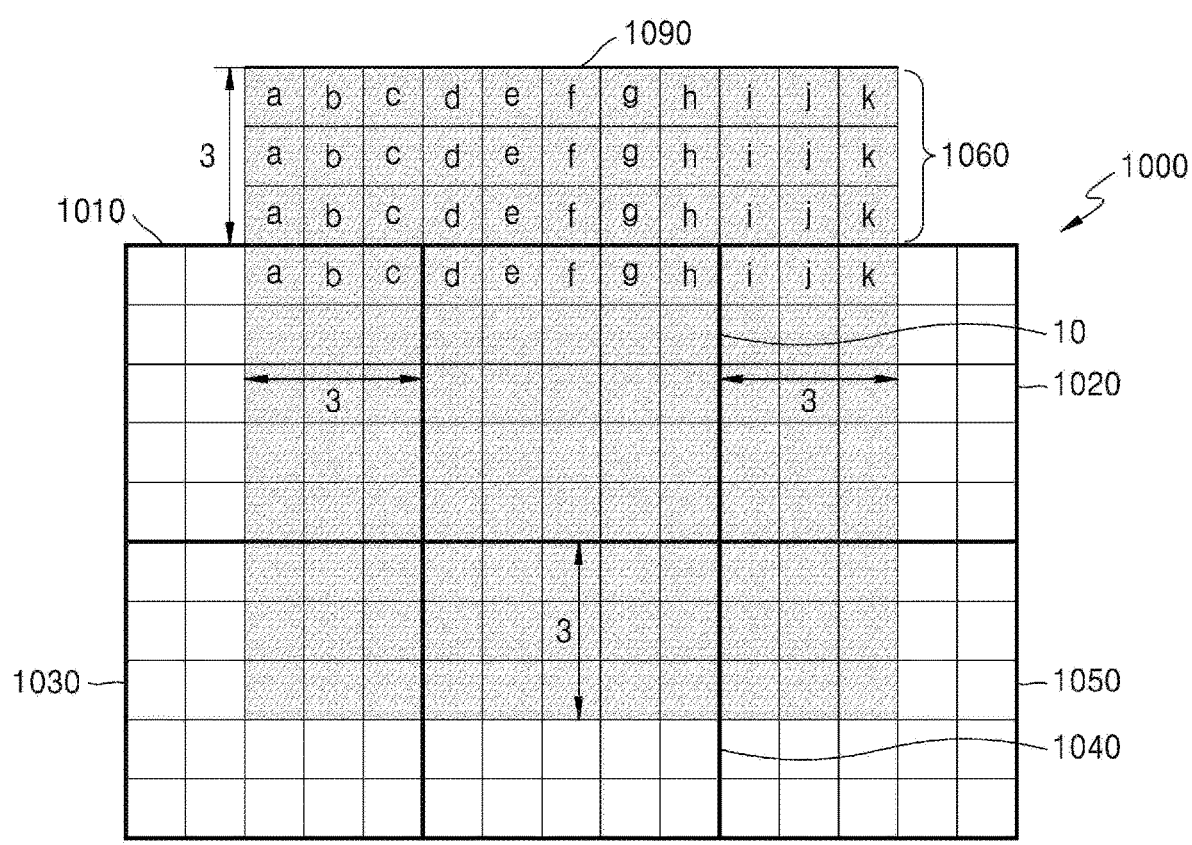
FIG. 10 is a diagram showing an extended block in a case when an extension distance is determined to be 3, according to an embodiment of the disclosure.

FIG. 10 is a diagram showing an extended block 1090 in a case when an extension distance is determined to be 3, according to an embodiment of the disclosure.

When the extension distance is determined to be 3, the AI-based image processor 134 may determine the extended block 1090 including samples within the current block 10, and neighboring samples located within the extension distance of 3 from among neighboring samples located outside the boundary of the current block 10.

When a current image 1000 is divided into six blocks, left block 1010, current block 10, right block 1020, lower left block 1030, lower block 1040, and lower right block 1050, and when an upper middle block is the current block 10, as illustrated in FIG. 10, the AI-based image processor 134 may select neighboring samples located within a left block 1010 of the current block 10 and located within the extension distance of 3 from a left boundary of the current block 10, neighboring samples located within a right block 1020 of the current block 10 and located within the extension distance of 3 from a right boundary of the current block 10, and neighboring samples located within a lower block 1040 of the current block 10 and located within the extension distance of 3 from a lower boundary of the current block 10. In this case, to determine a extended block 1090, neighboring samples located within a lower left block 1030 of the current block 10 and neighboring samples located within a lower right block 1050 of the current block 10 may also be selected.

When a boundary of the current block 10 corresponds to a boundary of the current image 1000, for example, when an upper boundary of the current block 10 corresponds to an upper boundary of the current image 1000, as illustrated in FIG. 10, neighboring samples located outside the upper boundary of the current block 10 do not exist. Therefore, the AI-based image processor 134 may determine neighboring samples 1060 located outside the upper boundary of the current block 10, by using samples closest to the neighboring samples 1060 located outside the upper boundary of the current block 10.

As illustrated in FIG. 10, values of neighboring samples located in a leftmost column from among the neighboring samples 1060 located outside the upper boundary of the current block 10 may be determined as a closest sample value a, and values of neighboring samples located in a rightmost column may be determined as a closest sample value k.

The AI-based image processor 134 may apply, to the neural network 300, the extended block 1090 having a size of 11×11 greater than the size of 5×5 of the current block 10, and obtain a 5×5 first modified block having the same size as that of the current block 10.

Because the current block 10 and the quantization error map 20 input to the neural network 300 need to have the same size, when the extended block 1090 is input to the neural network 300, the AI-based image processor 134 needs to generate an extended quantization error map having the same size as the extended block 1090, and a description thereof will now be provided with reference to FIG. 11.

FIG. 11 is a diagram showing an extended quantization error map 1120 corresponding to an extended block, according to an embodiment of the disclosure.

The left side of FIG. 11 illustrates the quantization error map 20 illustrated in FIG. 2, and the right side of FIG. 11 illustrates the extended quantization error map 1120 according to an embodiment of the disclosure.

When the current block 10 is divided into a first lower block 11, a second lower block 12, a third lower block 13, and a fourth lower block 14, and when quantization parameters of the first to the fourth lower blocks 11 to 14 are respectively a, b, c, and a, as illustrated in FIG. 2, the first to the fourth blocks 21 to 24 within the quantization error map 20 corresponding to the first to the fourth lower blocks 11 to 14 may have sample values of a', b', c', and a'. Although samples are not indicated on the quantization error map 20 illustrated on the left side of FIG. 11, the first to the fourth blocks 21 to 24 may include a plurality of samples, and the samples may have the sample values of a', b', c', and a'.

When samples within the current block 10 and neighboring samples adjacent thereto configure the extended block, values of neighboring samples outside the quantization error map 20 may be determined based on quantization parameters of lower blocks including neighboring samples located outside the boundary of the current block 10.

As illustrated on the right side of FIG. 11, samples of a left block 1121 of the first block 21 have a value of e', and samples of a left block 1122 of the third block 23 have a value of a'. Herein, e' and a' may be respectively calculated based on a quantization parameter assigned to a lower block located at a left side of the first lower block 11 of the current block 10, and a quantization parameter assigned to a lower block located at a left side of the third lower block 13.

Samples of a lower left block 1123 of the third block 23 may have a value of f', samples of a lower block 1124 of the third block 23 may have a value of c', and samples of a lower block 1125 of the fourth block 24 may have a value of a'. Samples of a lower right block 1126 of the fourth block 24 may have a value of e', and samples of a right block 1127 of the second and fourth blocks 22 and 24 may have a value of d'.

As described above in relation to FIG. 10, when the boundary (e.g., an upper boundary) of the current block 10 corresponds to the boundary of the current image 1000, neighboring samples located outside the boundary of the current block 10 may be determined based on closest samples available to the neighboring samples. Likewise, neighboring samples located outside the boundary of the quantization error map 20 may also be determined based on closest samples available to the neighboring samples.

When the upper boundary of the current block 10 corresponds to the boundary of the current image 1000, as illustrated on the right side of FIG. 11, samples located outside the upper boundary of the quantization error map 20 may have values of e', a', b', and a'. That is, samples of an upper left block 1131 of the first block 21 may be determined based on the samples of the left block 1121 of the first block 21, which are closest thereto, and samples of an upper block 1130 of the first block 21 may be determined based on samples of the first block 21, which are closest thereto. Samples of an upper block 1129 of the second block 22 may be determined based on samples of the second block 22, which are closest thereto, and samples of an upper right block 1128 of the second block 22 may be determined based on the samples of the right block 1127 of the second block 22, which are closest thereto.

Meanwhile, in an embodiment of the disclosure, the AI-based image processor 134 may select a weight set to be set for the neural network 300 from among a plurality of weight sets based on the feature value of the current block or the upper block, and a description thereof will now be provided with reference to FIG. 12.

FIG. 12 is a table showing correspondences between a plurality of weight sets and features of a block, according to an embodiment of the disclosure. The correspondences shown in FIG. 12 may be pre-stored in the image processing apparatus 100.

Each of the plurality of weight sets may be generated as a result of training the neural network 300. For example, a weight set A, a weight set B, and a weight set C shown in FIG. 12 may be obtained by training the neural network 300 for different purposes of training. When different purposes of training are set, it may mean that different training images are used to train the neural network 300 or that loss information is calculated in different manners.

Figure 15:
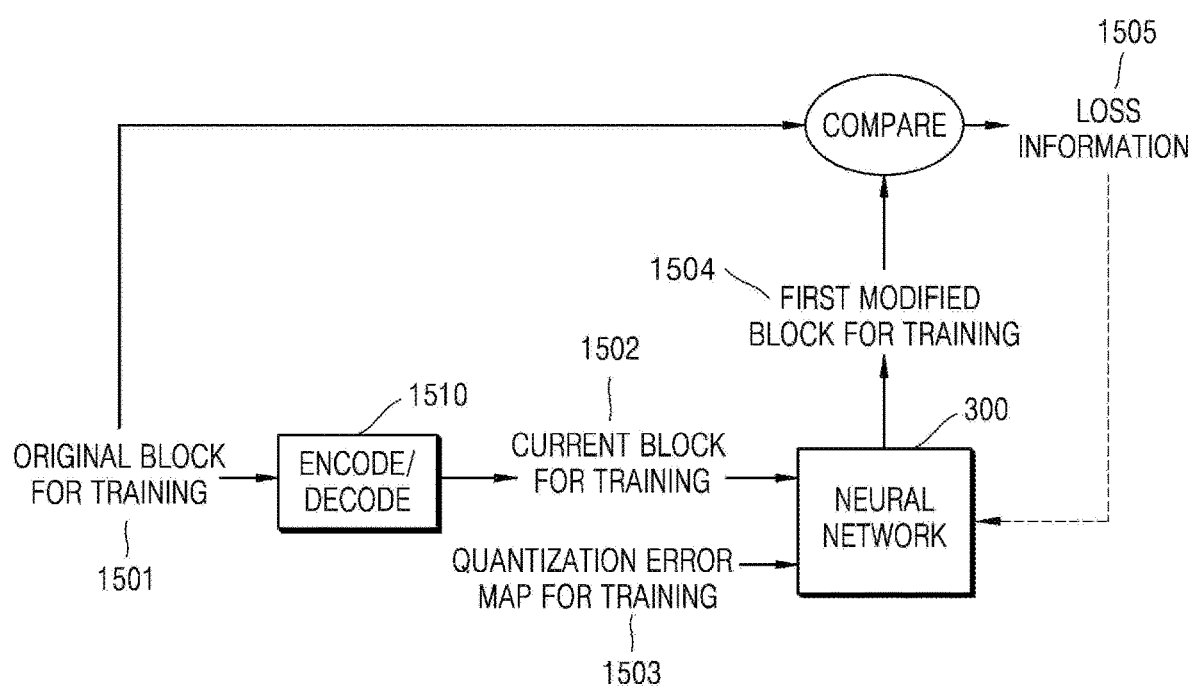
FIG. 15 is a diagram for describing a method of training a neural network, according to an embodiment of the disclosure.

For example, loss information 1505 corresponding to a difference between a first modified block 1504 for training and an original block 1501 for training may be used to train the neural network 300 illustrated in FIG. 15 and, because a difference between two blocks may be calculated using a variety of methods, the weight set A may be generated by training the neural network 300 based on the loss information 1505 calculated using a first method, and the weight set B may be generated by training the neural network 300 based on the loss information 1505 calculated using a second method. The weight set C may be generated by training the neural network 300 based on the loss information 1505 calculated using a third method.

Because the AI-based image processor 134 according to an embodiment of the disclosure adaptively sets a weight of the neural network 300 based on the feature of the current block or the upper block, the current block may be effectively filtered. Herein, when the neural network 300 is set with a weight set, it may mean that a weight of a filter kernel used by a convolutional layer of the neural network 300 are set as a weight included in the weight set.

Referring to FIG. 12, the weight set A may be selected when the feature value is greater than a first threshold value, the weight set B may be selected when the feature value is less than or equal to the first threshold value and greater than a second threshold value, or the weight set C may be selected when the feature value is less than or equal to the second threshold value and greater than a third threshold value.

Although three weight sets are shown in FIG. 12, three is merely an example, and the number of weight sets may be variously determined and the condition corresponding to each weight set may also be variously set.

In an embodiment of the disclosure, the feature value used to select the weight set may be calculated in a different manner from the above-described feature value used to select the parameter set and the parameter for the current block. For example, the feature value used to select one of one or more parameter sets may be calculated based on the above-described value corresponding to i), and the feature value used to select the weight set may be calculated based on the value corresponding to v).

Depending on implementation, the AI-based image processor 134 may select a weight set indicated by third information included in the encoded data from among the plurality of weight sets, and set the neural network 300 with the selected weight set.

In an embodiment of the disclosure, the AI-based image processor 134 may determine whether to apply AI-based filtering to the current block, based on the features of the current block or the upper block. For example, as shown in FIG. 12, when the feature value is less than or equal to the third threshold value, the AI-based image processor 134 may determine not to apply AI-based filtering to the current block. In this case, the current block may be output from the image processing apparatus 100.

Applying AI-based filtering to the current block even when a probability that errors exist in the current block is low may cause unnecessary load of the image processing apparatus 100. Therefore, when it is determined that AI-based filtering is not required, based on the features of the current block or the upper block, the AI-based image processor 134 may skip AI-based filtering of the current block.

In an embodiment of the disclosure, information (e.g., a flag) indicating whether to apply AI-based filtering to the current block may be obtained from the encoded data, and it may be determined whether to apply AI-based filtering to the current block, based on the obtained information.

Figure 13:
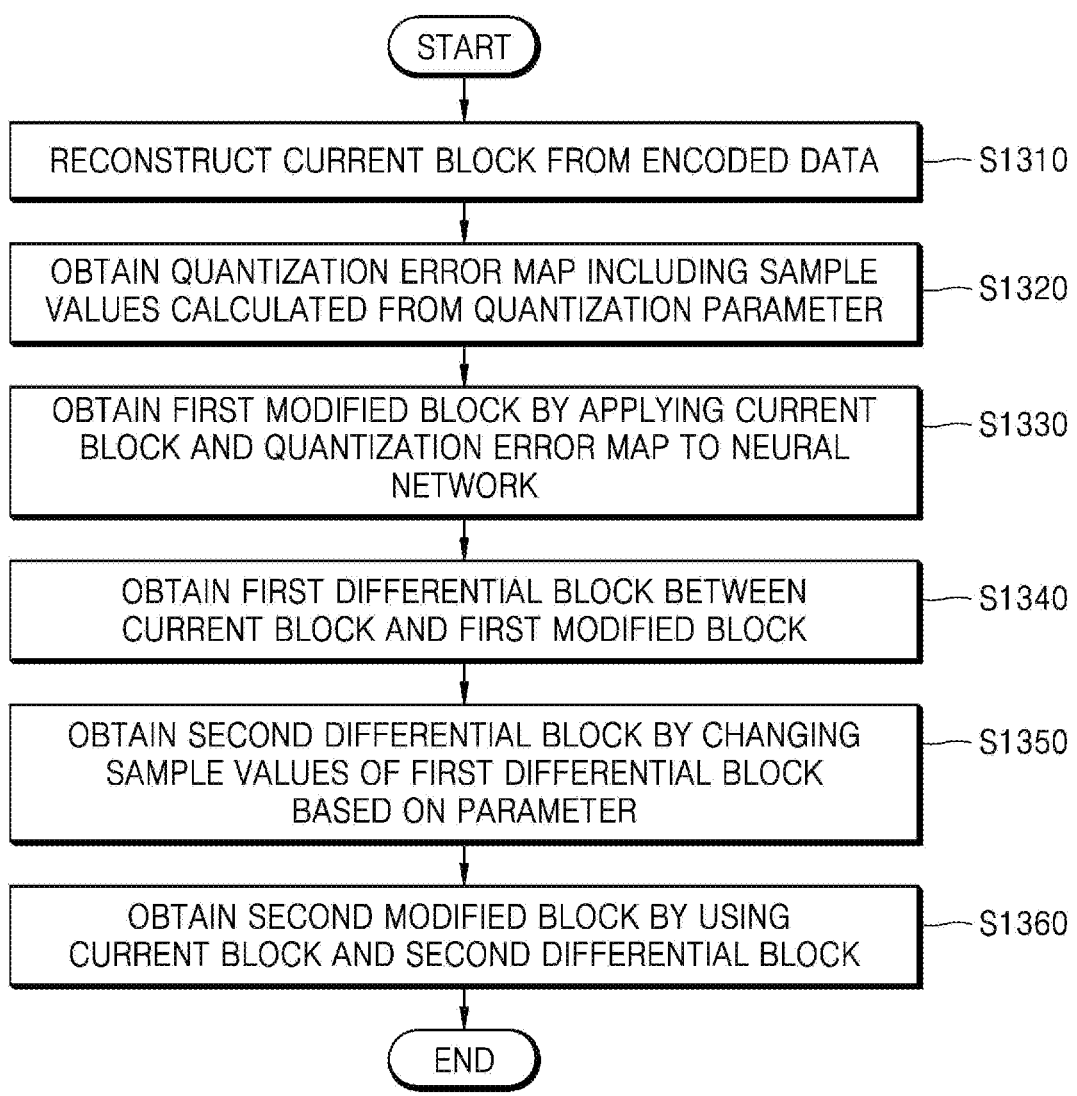
FIG. 13 is a flowchart of an image processing method performed by an image processing apparatus, according to an embodiment of the disclosure.

FIG. 13 is a flowchart of an image processing method performed by the image processing apparatus 100, according to an embodiment of the disclosure.

In operation S1310, the image processing apparatus 100 reconstructs a current block by decoding encoded data. The encoded data may be generated by encoding an original block within an original image.

In an embodiment of the disclosure, the image processing apparatus 100 may receive the encoded data or a bitstream corresponding to the encoded data, from an external device through a network.

In another embodiment of the disclosure, the image processing apparatus 100 may receive the encoded data or the bitstream corresponding to the encoded data, from a data storage medium including a magnetic medium such as a hard disk, a floppy disk, or magnetic tape, an optical medium such as a compact disc read-only memory (CD-ROM) or a digital versatile disc (DVD), or a magneto-optical medium such as a floptical disk.

In operation S1320, the image processing apparatus 100 obtains a quantization error map including sample values calculated based on a quantization parameter included in the encoded data.

In operation S1330, the image processing apparatus 100 obtains a first modified block by applying the current block and the quantization error map to the neural network 300.

In an embodiment of the disclosure, the image processing apparatus 100 may obtain the first modified block by applying an extended block and an extended quantization error map to the neural network 300.

In an embodiment of the disclosure, the image processing apparatus 100 may apply a feature map including, as sample values, feature values obtained by analyzing the current block or an upper block, to the neural network 300 together with the current block and the quantization error map.

In an embodiment of the disclosure, the image processing apparatus 100 may obtain the first modified block by applying a predicted block and/or a residual block used to reconstruct the current block, to the neural network 300 together with the current block and the quantization error map.

In operation S1340, the image processing apparatus 100 obtains a first differential block between the current block and the first modified block.

In operation S1350, the image processing apparatus 100 determines a parameter based on features of the current block and the upper block, and obtains a second differential block by changing sample values of the first differential block based on the parameter.

In operation S1360, the image processing apparatus 100 obtains a second modified block by using the second differential block and the current block.

Figure 14:
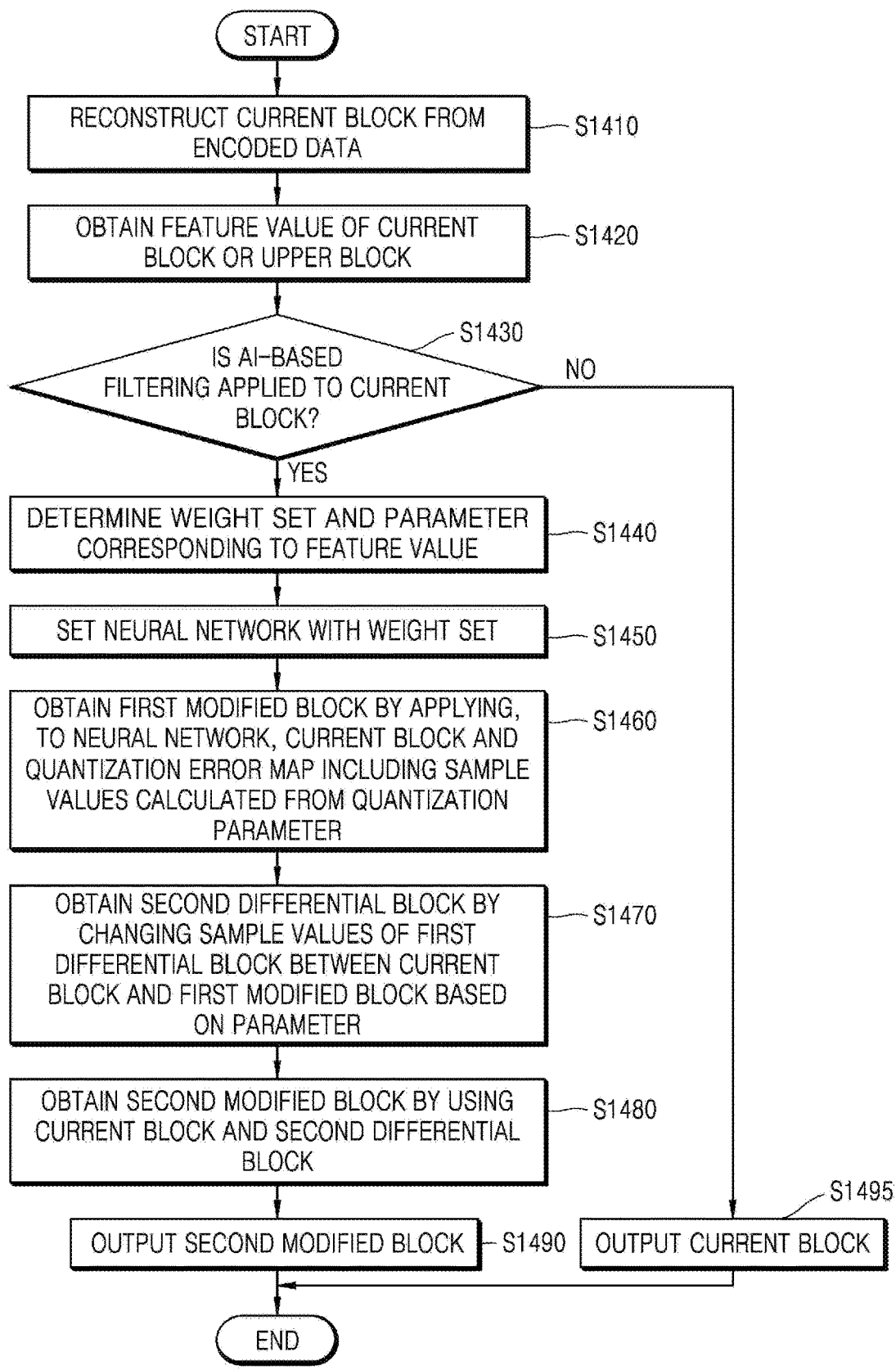
FIG. 14 is a flowchart of an image processing method performed by an image processing apparatus, according to an embodiment of the disclosure.

FIG. 14 is a flowchart of an image processing method performed by the image processing apparatus 100, according to an embodiment of the disclosure.

In operation S1410, the image processing apparatus 100 reconstructs a current block by decoding encoded data.

The encoded data may be generated by encoding an original block within an original image.

In an embodiment of the disclosure, the image processing apparatus 100 may receive the encoded data or a bitstream corresponding to the encoded data, from an external device through a network.

In another embodiment of the disclosure, the image processing apparatus 100 may receive the encoded data or the bitstream corresponding to the encoded data, from a data storage medium including a magnetic medium, such as a hard disk, a floppy disk, or magnetic tape, an optical medium, such as a CD-ROM or a DVD, or a magneto-optical medium, such as a floptical disk.

In operation S1420, the image processing apparatus 100 obtains a feature value by analyzing features of the current block or an upper block of the current block.

In operation S1430, the image processing apparatus 100 determines whether to apply AI-based filtering to the current block, based on the feature value.

When it is determined to apply AI-based filtering to the current block, in operation S1440, the image processing apparatus 100 determines a weight set and a parameter corresponding to the feature value.

In operation S1450, the image processing apparatus 100 sets the neural network 300 with the weight set. As such, the neural network 300 may operate based on weights included in the weight set.

In operation S1460, the image processing apparatus 100 generates a quantization error map including sample values calculated based on a quantization parameter included in the encoded data. The image processing apparatus 100 obtains a first modified block by applying the quantization error map and the current block to the neural network 300.

In an embodiment of the disclosure, the image processing apparatus 100 may obtain the first modified block by applying an extended block and an extended quantization error map to the neural network 300.

In an embodiment of the disclosure, the image processing apparatus 100 may apply a feature map including, as sample values, feature values obtained by analyzing the current block or the upper block, to the neural network 300 together with the current block and the quantization error map.

In an embodiment of the disclosure, the image processing apparatus 100 may obtain the first modified block by applying a predicted block and/or a residual block used to reconstruct the current block, to the neural network 300 together with the current block and the quantization error map.

In operation S1470, the image processing apparatus 100 obtains a first differential block between the current block and the first modified block, determines a parameter based on the features of the current block or the upper block, and obtains a second differential block by changing sample values of the first differential block based on the parameter.

In operation S1480, the image processing apparatus 100 obtains a second modified block by using the second differential block and the current block.

In operation S1490, the image processing apparatus 100 outputs the second modified block.

When it is determined in operation S1430 not to apply AI-based filtering to the current block, in operation S1495, the image processing apparatus 100 outputs the current block.

A method of training the neural network 300 will now be described with reference to FIG. 15.

FIG. 15 is a diagram for describing a method of training the neural network 300, according to an embodiment of the disclosure.

An original block 1501 for training, which is illustrated in FIG. 15, may correspond to the above-described original block, and a current block 1502 for training may correspond to the current block illustrated in FIG. 1. A quantization error map 1503 for training and a first modified block 1504 for training may correspond to the quantization error map and the first modified block illustrated in FIG. 1.

Based on the method of training the neural network 300, according to the disclosure, the neural network 300 is trained in such a manner that the first modified block 1504 for training, which is output from the neural network 300, is the same as or similar to the original block 1501 for training. To this end, loss information 1505 corresponding to a difference between the first modified block 1504 for training and the original block 1501 for training may be used to train the neural network 300.

The method of training the neural network 300 will now be described in detail with reference to FIG. 15. Initially, the current block 1502 for training is obtained by encoding/decoding (see reference numeral 1510) the original block 1501 for training.

The current block 1502 for training and the quantization error map 1503 for training, which corresponds to the current block 1502 for training, are input to the neural network 300, and the first modified block 1504 for training is output from the neural network 300. The neural network 300 may operate based on a preset weight.

The loss information 1505 corresponding to the difference between the first modified block 1504 for training and the original block 1501 for training is calculated, and the weight set for the neural network 300 is updated based on the loss information 1505. The neural network 300 may update the weight to reduce or minimize the loss information 1505.

The loss information 1505 may include at least one of an L1-norm value, an L2-norm value, a structural similarity (SSIM) value, a peak signal-to-noise ratio-human vision system (PSNR-HVS) value, a multiscale SSIM (MS-SSIM) value, a variance inflation factor (VI F) value, or a video multimethod assessment fusion (VMAF) value for the difference between the original block 1501 for training and the first modified block 1504 for training.

Although the loss information 1505 corresponding to the difference between the original block 1501 for training and the first modified block 1504 for training is calculated in FIG. 15, depending on implementation, the loss information 1505 may correspond to a difference between the original block 1501 for training and a second modified block for training. Herein, the second modified block for training may be obtained by obtaining a first differential block for training based on the current block 1502 for training and the first modified block 1504 for training, obtaining a second differential block for training by changing sample values of the first differential block for training based on a parameter, and adding the second differential block for training and the current block 1502 for training.

In another embodiment of the disclosure, when the second modified block illustrated in FIG. 1 is processed using one or more predetermined filtering algorithms, the loss information 1505 may correspond to a difference between the original block 1501 for training and the second modified block for training processed using the one or more predetermined filtering algorithms.

The neural network 300 according to an embodiment of the disclosure may be trained by a training device. The training device may be the image processing apparatus 100. Depending on implementation, the training device may be an external server. In this case, weights and the neural network 300 trained by the external server may be transmitted to the image processing apparatus 100.

Figure 16:
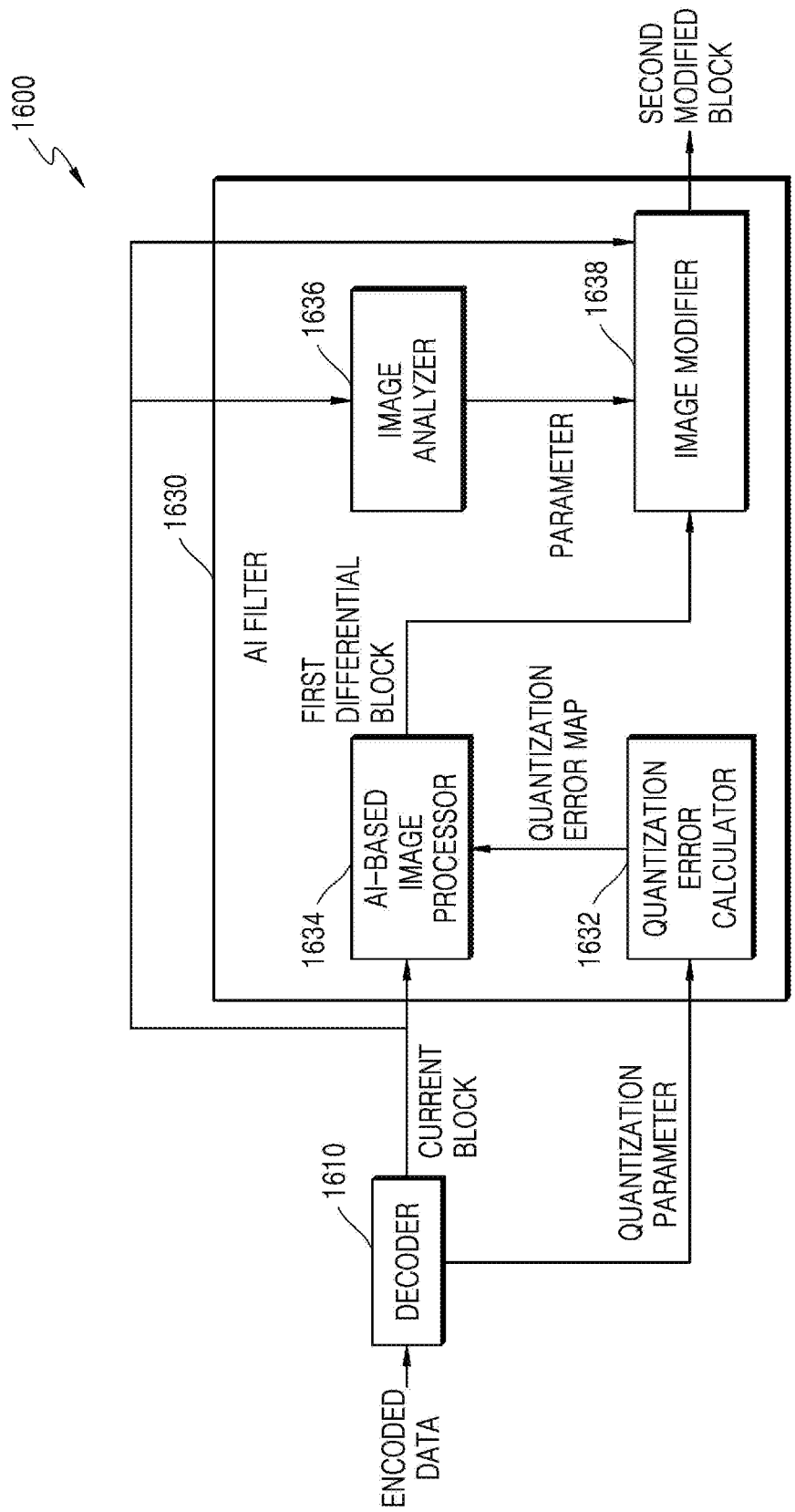
FIG. 16 is a block diagram of an image processing apparatus according to another embodiment of the disclosure.

FIG. 16 is a block diagram of an image processing apparatus 1600 according to another embodiment of the disclosure.

Referring to FIG. 16, the image processing apparatus 1600 may include a decoder 1610 and an AI filter 1630.

The AI filter 1630 may include a quantization error calculator 1632, an AI-based image processor 1634, an image analyzer 1636, and an image modifier 1638.

The elements of the image processing apparatus 1600 illustrated in FIG. 16 are the same as those of the image processing apparatus 100 illustrated in FIG. 1 except that the AI-based image processor 1634 outputs a first differential block instead of a first modified block. When the neural network 300 does not include the summation layer 360 illustrated in FIG. 3, the AI-based image processor 1634 may output the first differential block.

The image modifier 1638 may obtain a second differential block by changing sample values of the first differential block based on a parameter provided from the image analyzer 1636, and obtain a second modified block by combining the second differential block and a current block.

A method of training the neural network 300 not including the summation layer 360 will now be described. The neural network 300 illustrated in FIG. 15 may output a first differential block for training instead of a first modified block for training. The loss information 1505 may correspond to a difference between the first differential block for training and a differential block between the original block 1501 for training and the current block 1502 for training.

Meanwhile, the afore-described embodiments of the disclosure may be written as a computer-executable program, and the written program may be stored in a machine-readable storage medium.

A machine-readable storage medium may be provided in the form of a non-transitory storage medium. When the storage medium is 'non-transitory', it means that the storage medium is tangible and does not include signals (e.g., electromagnetic waves), and it does not limit that data is semi-permanently or temporarily stored in the storage medium. For example, the 'non-transitory storage medium' may include a buffer that stores data temporarily.

According to an embodiment of the disclosure, the method according to various embodiments of the disclosure may be included and provided in a computer program product. The computer program product may be traded as a commercial product between sellers and purchasers. The computer program product may be distributed in the form of a machine/computer-readable storage medium (e.g., a compact disc read only memory (CD-ROM)), or be electronically distributed (e.g., downloaded or uploaded) via an application store or directly between two user devices (e.g., smartphones). For electronic distribution, at least a part of the computer program product (e.g., a downloadable app) may be temporarily generated or be at least temporarily stored in a machine-readable storage medium, e.g., a memory of a server of a manufacturer, a server of an application store, or a relay server.

While the disclosure has been particularly shown and described with reference to embodiments of the disclosure, it will be understood by one of ordinary skill in the art that various changes in form and details may be made therein without departing from the scope of the disclosure as defined by the following claims.

The invention claimed is:

1. An image processing apparatus comprising:
a memory storing one or more instructions; and
a processor configured to operate based on the one or more instructions to:
reconstruct a current block from encoded data of the current block;
obtain a quantization error map comprising sample values calculated based on a quantization parameter;
calculate an extension distance based on at least one among a number of convolutional layers in a neural network and a size of a filter kernel used by the convolutional layers;
obtain a first modified block by applying, to the neural network, an extended block and the quantization error map, wherein the extended block comprises samples of the current block and neighboring samples corresponding to the extension distance from among neighboring samples outside a boundary of the current block in a current image; and
obtain a second modified block from the first modified block based on a parameter dependent on a feature of the current block.

2. The image processing apparatus of claim 1, wherein the processor is further configured to:
obtain a first differential block between the current block and the first modified block;
obtain a second differential block by changing sample values of the first differential block, the changing of the sample values being based on the parameter dependent on the feature of the current block; and
obtain the second modified block by combining the current block and the second differential block.

3. The image processing apparatus of claim 1, wherein the sample values of the quantization error map correspond to a quantization step size or a quantization error value calculated based on the quantization parameter.

4. The image processing apparatus of claim 1, wherein, when quantization parameters for lower blocks of the current block are included in the encoded data, the sample values of the quantization error map are calculated for each of the lower blocks.

5. The image processing apparatus of claim 2, wherein the processor is further configured to:
select a parameter indicated by first information obtained from the encoded data, from among a plurality of candidate parameters; and
obtain the second differential block by changing the sample values of the first differential block based on the selected parameter.

6. The image processing apparatus of claim 5, wherein the processor is further configured to:
select a parameter set indicated by second information obtained from the encoded data, from among a plurality of parameter sets; and
select the parameter indicated by the first information, from among the plurality of candidate parameters in the selected parameter set.

7. The image processing apparatus of claim 6, wherein the second information is obtained for an upper block comprising the current block, and
wherein the first information is obtained for the current block.

8. The image processing apparatus of claim 1, wherein the processor is further configured to obtain a feature value of the current block or an upper block of the current block to determine the parameter.

9. The image processing apparatus of claim 8, wherein the feature value is obtained based on at least one of i) a sum of squares of residual sample values obtained to reconstruct the current block or the upper block, ii) an average of the squares of the residual sample values, iii) a maximum value from among the residual sample values, iv) a maximum value from among absolute values of the residual sample values, v) a number of non-zero (0) transformation coefficients from among transformation coefficients corresponding to residual samples, vi) a value indicating a type of a slice corresponding to the current block, vii) a ratio between an area of a block to which intra prediction is applied and an area of a block to which inter prediction is applied, in the current block or the upper block, viii) a sharpness of the current block or the upper block, ix) an average of one or more quantization step sizes calculated based on one or more quantization parameters set for the current block or the upper block, or x) an average of one or more quantization error values calculated from the one or more quantization parameters.

10. The image processing apparatus of claim 2, wherein the parameter comprises a scale factor, and
wherein the processor is further configured to obtain the second differential block by scaling the sample values of the first differential block, the scaling being based on the scale factor.

11. The image processing apparatus of claim 2, wherein the parameter comprises a clipping factor, and
wherein the processor is further configured to obtain the second differential block by clipping the sample values of the first differential block based on an upper limit and a lower limit corresponding to the clipping factor.

12. The image processing apparatus of claim 1, wherein the processor is further configured to:
obtain a feature value of the current block or an upper block of the current block; and
select a weight set corresponding to the feature value from among a plurality of weight sets, and
wherein the extended block and the quantization error map are processed by a neural network operating based on the selected weight set.

13. The image processing apparatus of claim 1, wherein the processor is further configured to:
obtain a feature value of the current block or an upper block of the current block; and
determine whether to apply an AI-based filtering to the current block, based on the obtained feature value.

14. The image processing apparatus of claim 1, the neural network comprises:
at least one convolutional layer configured to output a first differential block by performing convolution on the extended block and the quantization error map, the performing of the convolution being based on a preset weight; and
a summation layer configured to output the first modified block by adding the first differential block and the current block.

15. The image processing apparatus of claim 14, wherein, when the boundary of the current block corresponds to a boundary of the current image, the neighboring samples corresponding to the extension distance are determined from available closest samples.

16. The image processing apparatus of claim 1, wherein the neural network is trained based on loss information corresponding to a difference between an original block for training, and a first modified block for training, which is obtained through the neural network, and
wherein the first modified block for training is obtained by applying, to the neural network, a current block for training, which is obtained by encoding and decoding the original block for training, and a quantization error map for training, which corresponds to the current block for training.

17. An image processing method comprising:
reconstructing a current block from encoded data of the current block;
obtaining a quantization error map comprising sample values calculated based on a quantization parameter;
calculating an extension distance based on at least one among a number of convolutional layers in a neural network and a size of a filter kernel used by the convolutional layers;
obtaining a first modified block by applying, to the neural network, an extended block and the quantization error map, wherein the extended block comprises samples of the current block and neighboring samples corresponding to the extension distance from among neighboring samples outside a boundary of the current block in a current image and obtaining a second modified block from the first modified block based on a parameter dependent on a feature of the current block.

18. A non-transitory computer-readable recording medium having recorded thereon a program for executing the method of claim 17 on a computer.

19. An image processing apparatus comprising:
a memory storing one or more instructions; and
a processor configured to operate based on the one or more instructions to:
reconstruct a current block from encoded data of the current block;
obtain a quantization error map comprising sample values calculated based on a quantization parameter;
calculate an extension distance based on at least one among a number of convolutional layers in a neural network and a size of a filter kernel used by the convolutional layers;
obtain a first differential block by applying, to the neural network, an extended block and the quantization error map, wherein the extended block comprises samples of the current block and neighboring samples corresponding to the extension distance from among neighboring samples outside a boundary of the current block in a current image;
obtain a second differential block by changing sample values of the first differential block, the changing of the sample values being based on a parameter dependent on a feature of the current block; and
obtain a modified block by combining the current block and the second differential block.

* * * * *